INVENTORS
JAMES C. DESHAZOR, JR.
LAWRENCE R. BURK
BY RICHARD S. JACKSON

Harold R. Beck
ATTORNEY

April 12, 1966  J. C. DE SHAZOR, JR., ETAL  3,245,196
METHOD AND APPARATUS FOR ASSEMBLING PACKAGES
Filed April 9, 1964  17 Sheets-Sheet 4

INVENTORS
JAMES C. DESHAZOR, JR.
LAWRENCE R. BURK
BY RICHARD S. JACKSON
Harold R. Beck
ATTORNEY

INVENTORS
JAMES C. DESHAZOR, JR.
LAWRENCE R. BURK
BY RICHARD S. JACKSON

Harold R. Beck

ATTORNEY

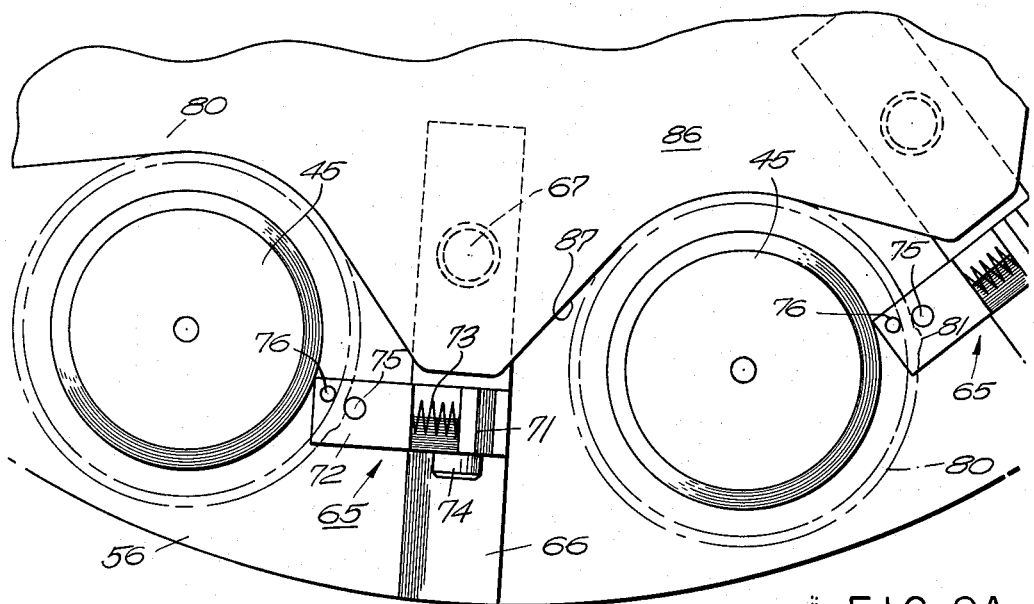
FIG. 8
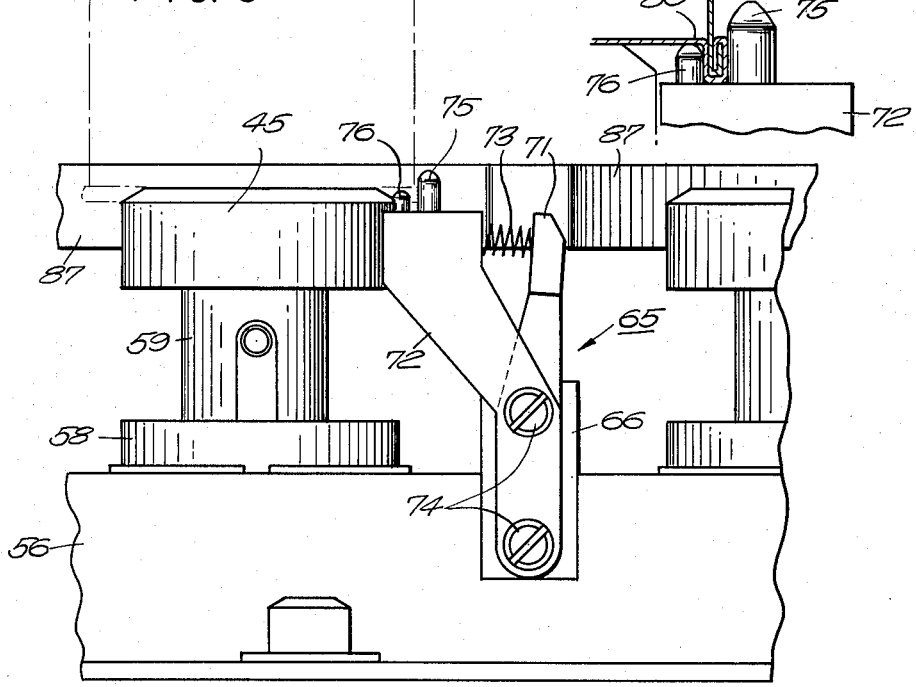
FIG. 9
FIG. 9A
INVENTORS
JAMES C. DESHAZOR, JR.
LAWRENCE R. BURK
BY RICHARD S. JACKSON
Harold R. Beck
ATTORNEY

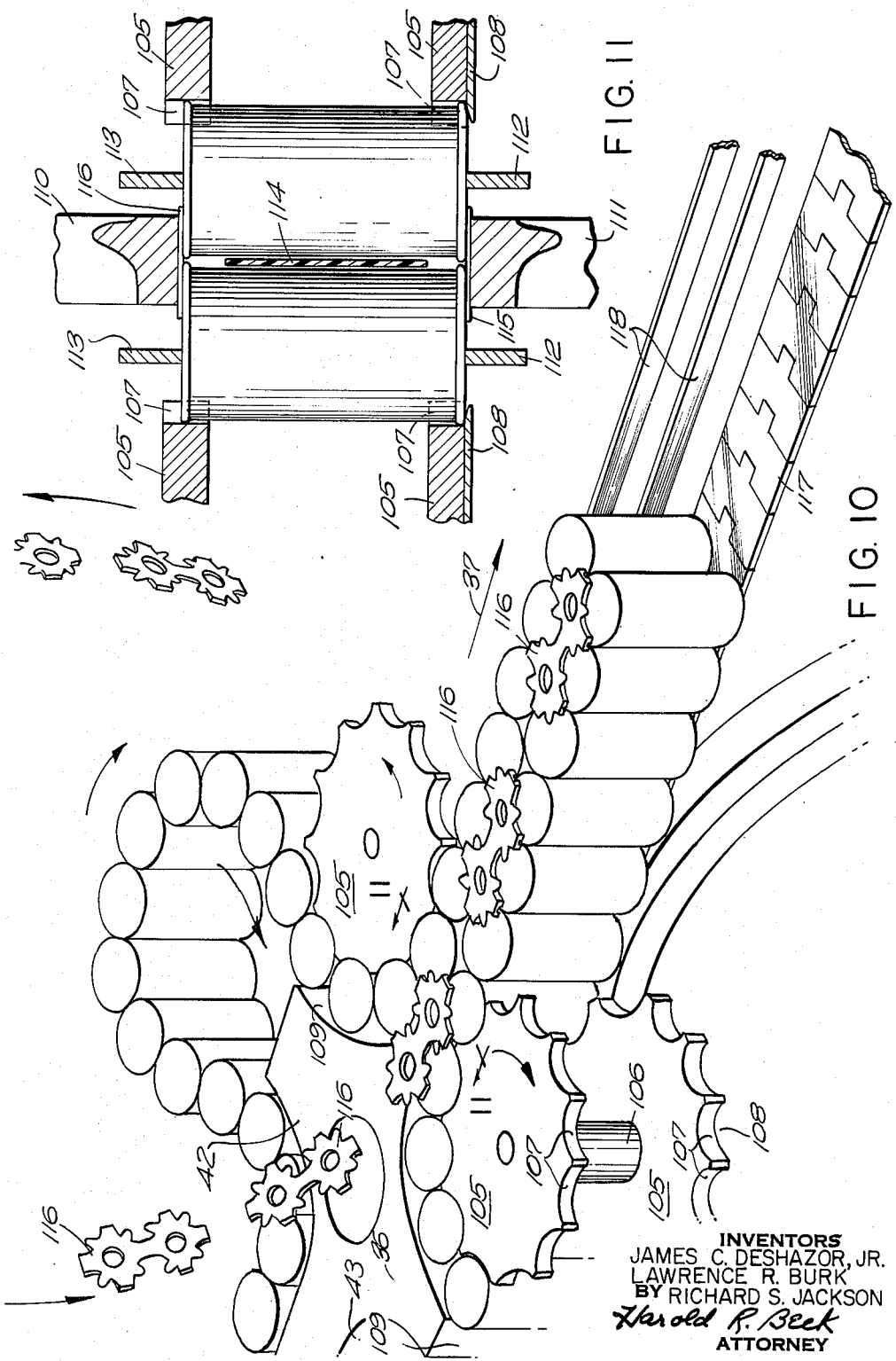

April 12, 1966   J. C. DE SHAZOR, JR., ETAL   3,245,196
METHOD AND APPARATUS FOR ASSEMBLING PACKAGES
Filed April 9, 1964   17 Sheets-Sheet 10

INVENTORS
JAMES C. DESHAZOR, JR.
LAWRENCE R. BURK
BY RICHARD S. JACKSON

*Harold R. Beck*
ATTORNEY

April 12, 1966  J. C. DE SHAZOR, JR., ET AL  3,245,196
METHOD AND APPARATUS FOR ASSEMBLING PACKAGES
Filed April 9, 1964  17 Sheets-Sheet 11

INVENTORS
JAMES C. DESHAZOR, JR.
LAWRENCE R. BURK
BY RICHARD S. JACKSON
Harold R. Beck
ATTORNEY

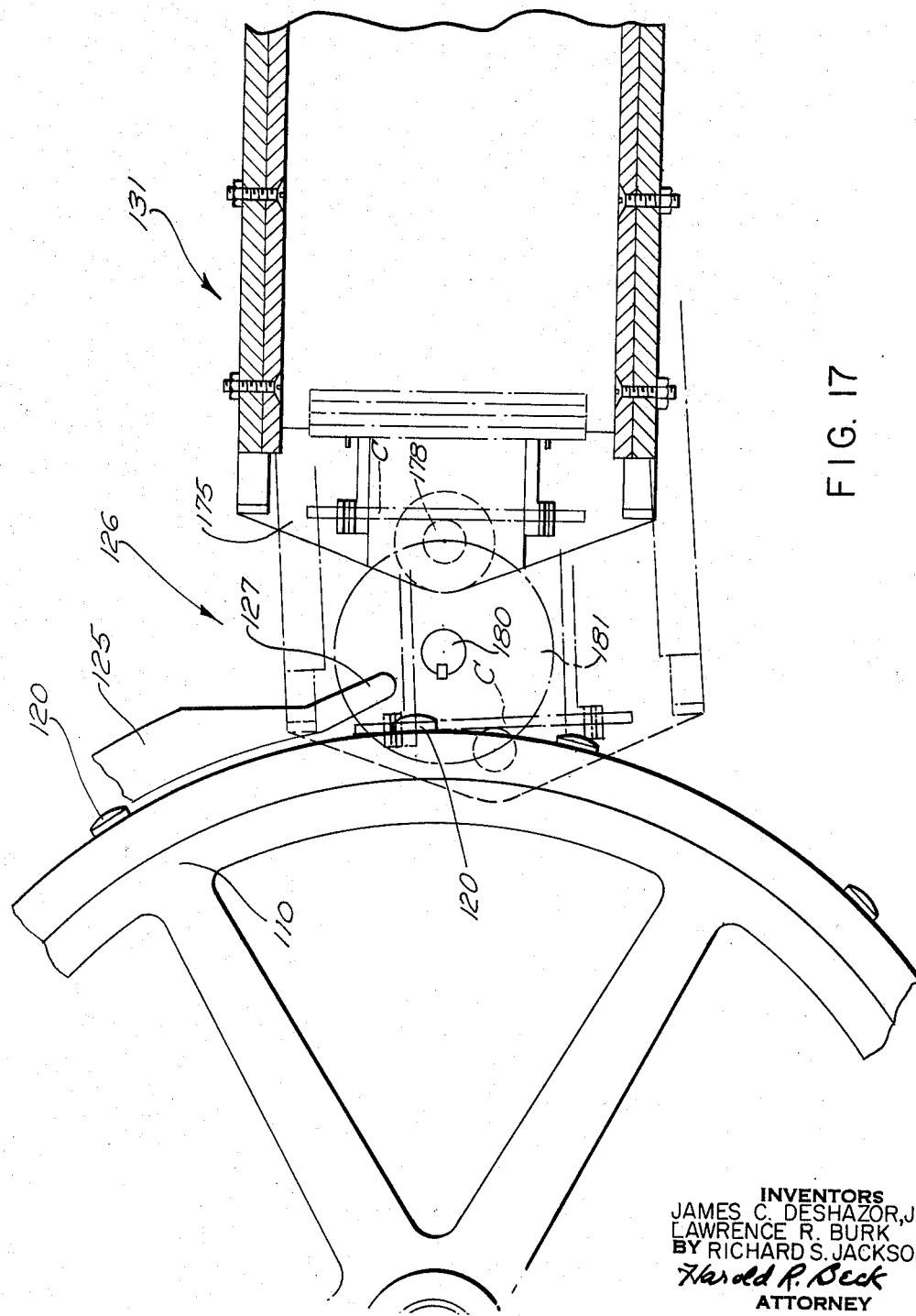

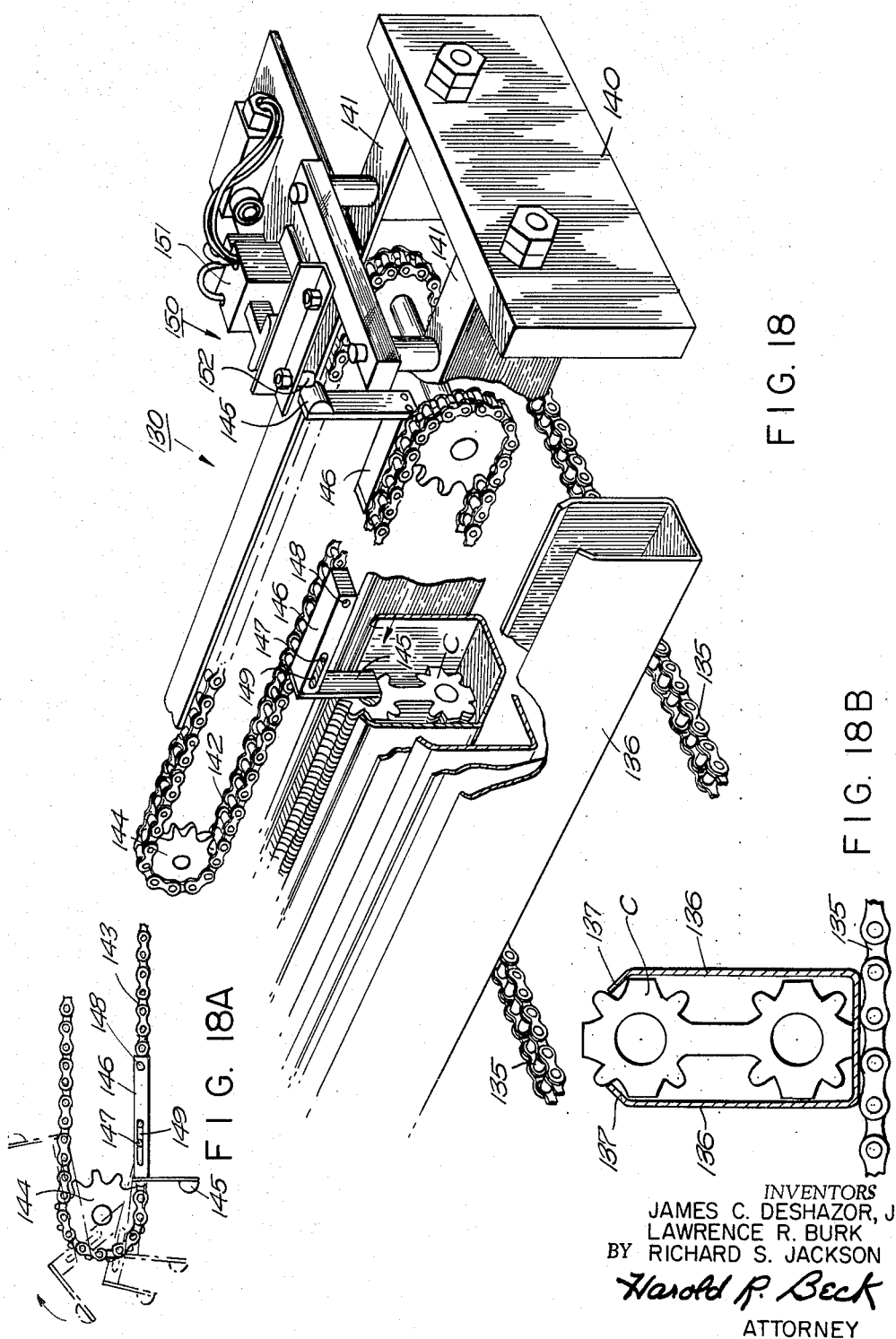

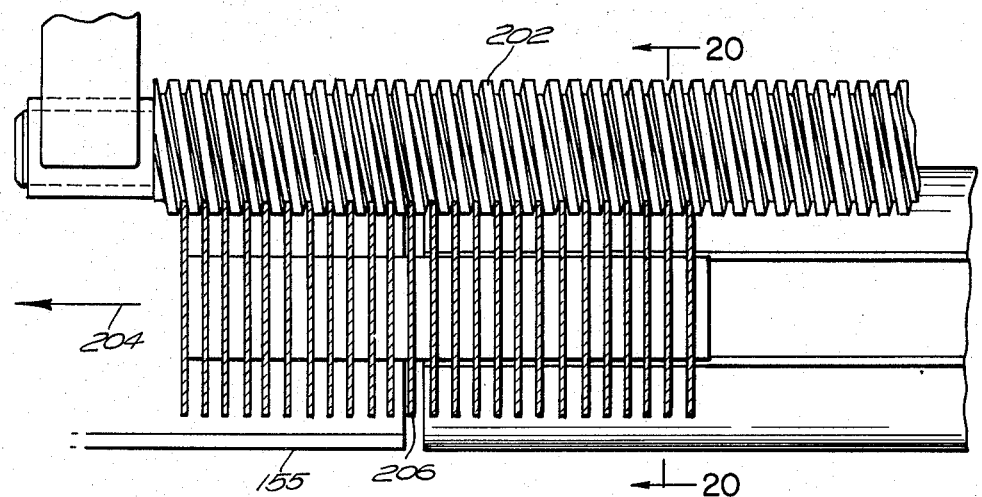
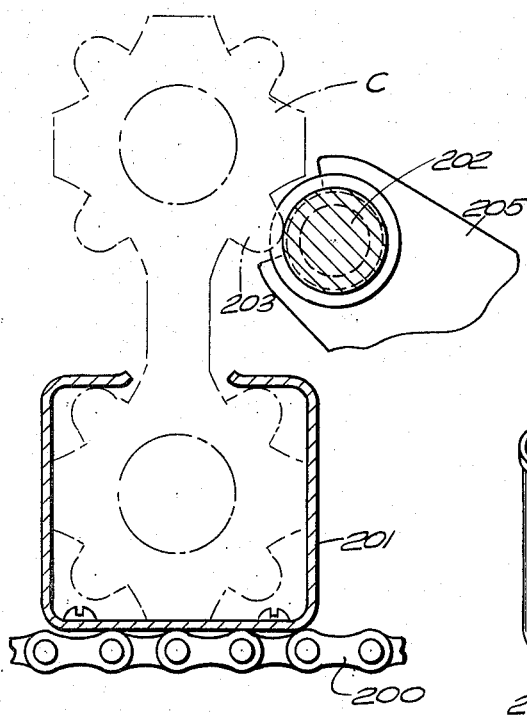
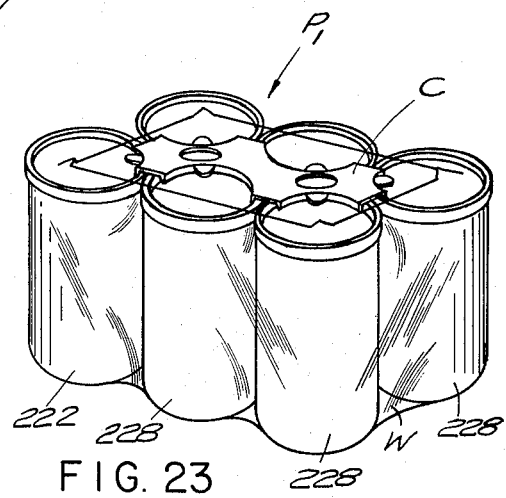

April 12, 1966    J. C. DE SHAZOR, JR., ETAL    3,245,196
METHOD AND APPARATUS FOR ASSEMBLING PACKAGES
Filed April 9, 1964      17 Sheets-Sheet 17
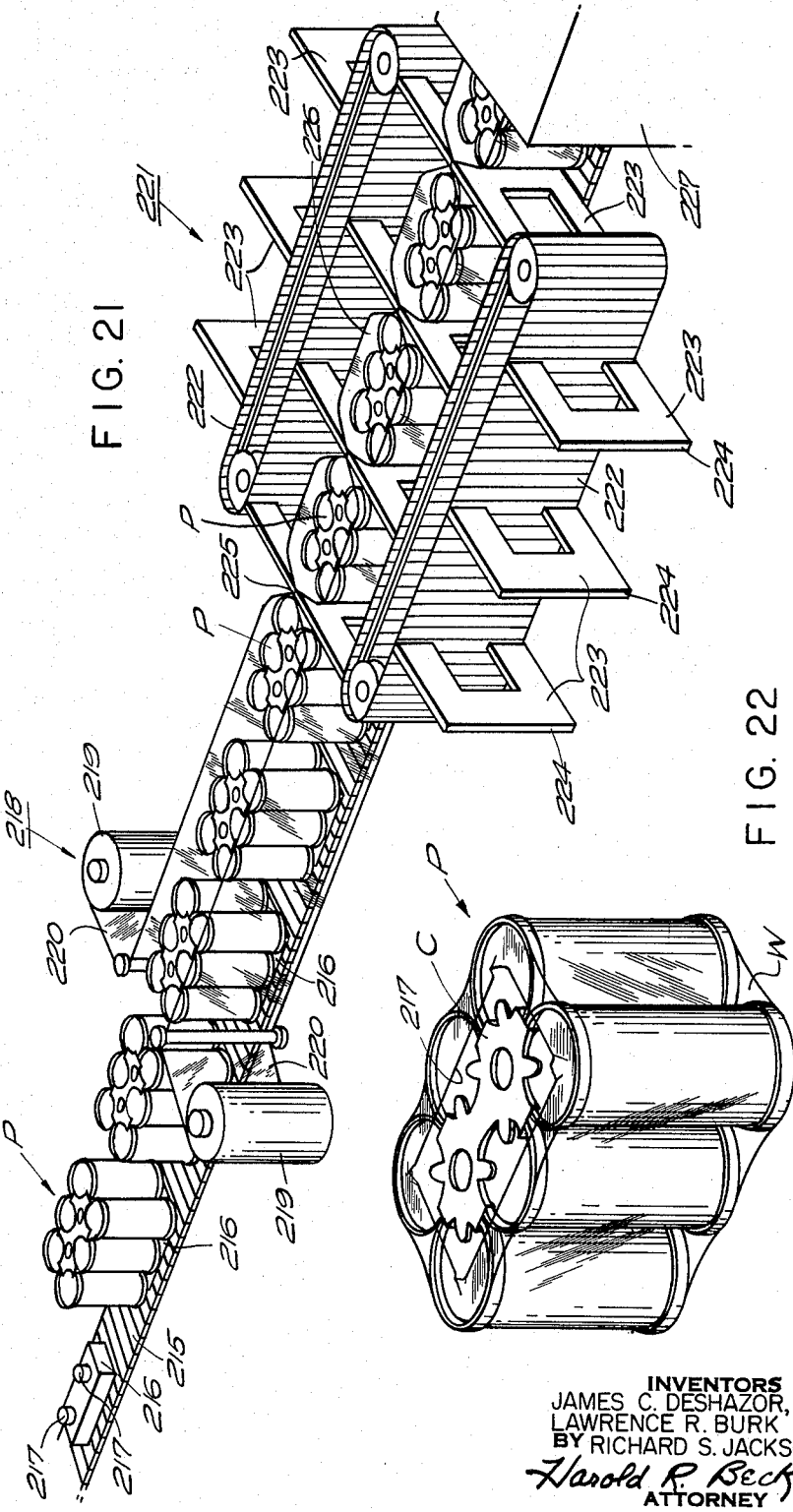
INVENTORS
JAMES C. DESHAZOR, JR.
LAWRENCE R. BURK
BY RICHARD S. JACKSON
Harold R. Beck
ATTORNEY United States Patent Office 3,245,196
Patented Apr. 12, 1966

3,245,196
METHOD AND APPARATUS FOR ASSEMBLING PACKAGES
James C. De Shazor, Jr., Sherman Oaks, Calif., and Lawrence R. Burk, St. Louis, and Richard S. Jackson, Crestwood, Mo., assignors to Rexall Drug and Chemical Company, Los Angeles, Calif., a corporation of Delaware
Filed Apr. 9, 1964, Ser. No. 358,441
13 Claims. (Cl. 53—26)

This is a continuation-in-part of U.S. patent applications Serial Nos. 100,618, filed April 4, 1961, and now abandoned; 174,655, filed February 12, 1962; 270,341, filed April 3, 1963; and 295,590, filed July 3, 1963. The disclosure of these prior applications is incorporated herein by reference.

This invention relates to a machine and method for assembling containers with clips to form multiple-container packages. Typical of the clip which may be assembled with the containers by the use of the machine and method of the present invention are those shown in U.S. patent applications Serial Nos. 100,618 and 174,655, and U.S. Patents D. 197,356, D. 197,357 and D. 197,358.

The method and apparatus of the present invention is typically applicable to form multiple container packages in which the containers are tubular metal sleeves having top and bottom ends affixed to the sleeves by beads, chimes or rims, and commonly referred to as "tin cans," and are extensively used to package food and beverages.

The present invention provides a new and improved machine and method for assembling containers and plastic clips to form a multiple-container package. Preferably these clips are formed from thermoplastic materials such as polyethylene, polypropylene or polystyrene. The preferred material of fabrication is a high-impact polystyrene which provides a rigid clip having sufficiently yieldability and flexibility to permit snapping portions of the clip over the can rim or chime with a minimum stressing of the plastic. In assembling the clips to the container rim, it is essential that the rim engaging portions of the clip are not overly stressed since the holding power of the clip in the assembled package may be diminished to the point that the package is unstable and insecure during shipping and consumer usage.

The machine and method according to the present invention fulfills the major requirements of the packaging industry, including:

(1) Very high speed operation, but adjustability to lower operating speeds while maintaining economical operation;
(2) High efficiency in assembling the packages;
(3) Low maintainance on the assembling equipment;
(4) Equipment which is easily adapted for use with high output container filling and closing machines presently in use in the packaging industry;
(5) Equipment which is easily adapted for assembling packages having two, three, four, six or eight units or cans therein;
(6) Equipment having high reliability insofar as producing a uniform and stable package;
(7) Equipment which will orient the cans so that the vertical seam of the can is positioned inwardly of the finished package;
(8) Equipment wherein the can orienting unit is adaptable for quick and single changes to locate the can seams at various desired locations, such that the cans on the end of a six-pack of canned beer or the like may be oriented at an angle so that the indicia on the can can be read from a side or end viewing of the package;
(9) Equipment which requires a minimum amount of personnel to operate the machine including the feeding of the clips;
(10) Equipment which may be easily unjammed in the event of a slight malfunction, since down time on the packaging equipment frequently results in down time on the filling and capping equipment;
(11) Equipment which minimizes damage to the cans, including abrasions to the labels or printing on the sides of the cans;
(12) Equipment which is readily adaptable for various heights and sizes of cans;
(13) Apparatus which will minimize shock to the substances being packaged—this is particularly important in the packaging of beer since it is widely accepted that beer which is subjected to shock is degraded in quality.

The method and apparatus of the present invention orients the container so that the predominant printing or decoration on the containers, such as a trademark or brand name, is displayed outwardly of the sides of the package and any vertical seam on the can is positioned inside the package where it may not be observed by the purchaser of the package. This invention permits the orientation of all known types of containers including: flat and non-flat top cans, steel cans, aluminum cans, cans with a steel body and aluminum ends, impact extruded cans, non-circular cans, plastic cans and plastic-metal cans. The method and apparatus readily adapts to changes in the amount of orientation desired in the container or the type of container being oriented.

The drawings illustrate a present preferred embodiment of the invention in which:

FIGURE 1 is a front perspective of an apparatus made according to the present invention, with parts removed for clarity;
FIGURE 2 is a side elevation view of an apparatus made according to the present invention, with parts removed for clarity;
FIGURE 3 is a top plan view of an apparatus made according to the present invention, with parts removed for clarity;
FIGURE 4 is a rear perspective of an apparatus made according to the present invention, viewed from the reverse machine end of the view of FIGURE 1;
FIGURE 5 is a schematic plan view illustrating the path of the can movement through the apparatus;
FIGURE 6 is an enlarged perspective of an infeed star wheel and orienting unit made according to the present invention;
FIGURE 7 is a vertical cross section of the orienting unit;
FIGURE 8 is an enlarged fragmentary plan view taken on line 8—8 of FIGURE 7;
FIGURE 9 is a side elevation view of FIGURE 8;
FIGURE 9A is an enlarged fragmentary view of a portion of FIGURE 9;
FIGURE 10 is a perspective schematic view illustrating the can and clip movement at a clipping station;
FIGURE 11 is a cross section taken on line 11—11 of FIGURE 10;
FIGURE 12 is a side elevation view of a clip feeding and positioning mechanism;
FIGURE 12A is a cross section taken on line 12A—12A of FIGURE 12;
FIGURE 13 is an enlarged perspective of the feed chute of the clip feeding mechanism;
FIGURE 14 is an enlarged fragmentary view of a portion of the clip feed chute of FIGURE 13;
FIGURE 15 is a cross section taken on line 15—15 of FIGURE 13;
FIGURE 16 is a view similar to FIGURE 15 but showing the feed mechanism in a second position;

FIGURE 17 is a side elevation view of the feed mechanisms and illustrates various feed positions;

FIGURE 18 is a perspective of a portion of the clip feed mechanism;

FIGURE 18A is a side elevation view of a clip pusher mechanism;

FIGURE 18B is a vertical cross section through a clip feed chute;

FIGURE 19 is a top plan view of a modified form of clip feed mechanism;

FIGURE 20 is a cross section taken on line 20—20 of FIGURE 19;

FIGURE 21 is a perspective of apparatus for enveloping the package in plastic film;

FIGURE 22 is a perspective of the package resulting from the operation of the apparatus of FIGURE 21; and FIGURE 23 is a modified form of the package of FIGURE 22.

Figure 1:
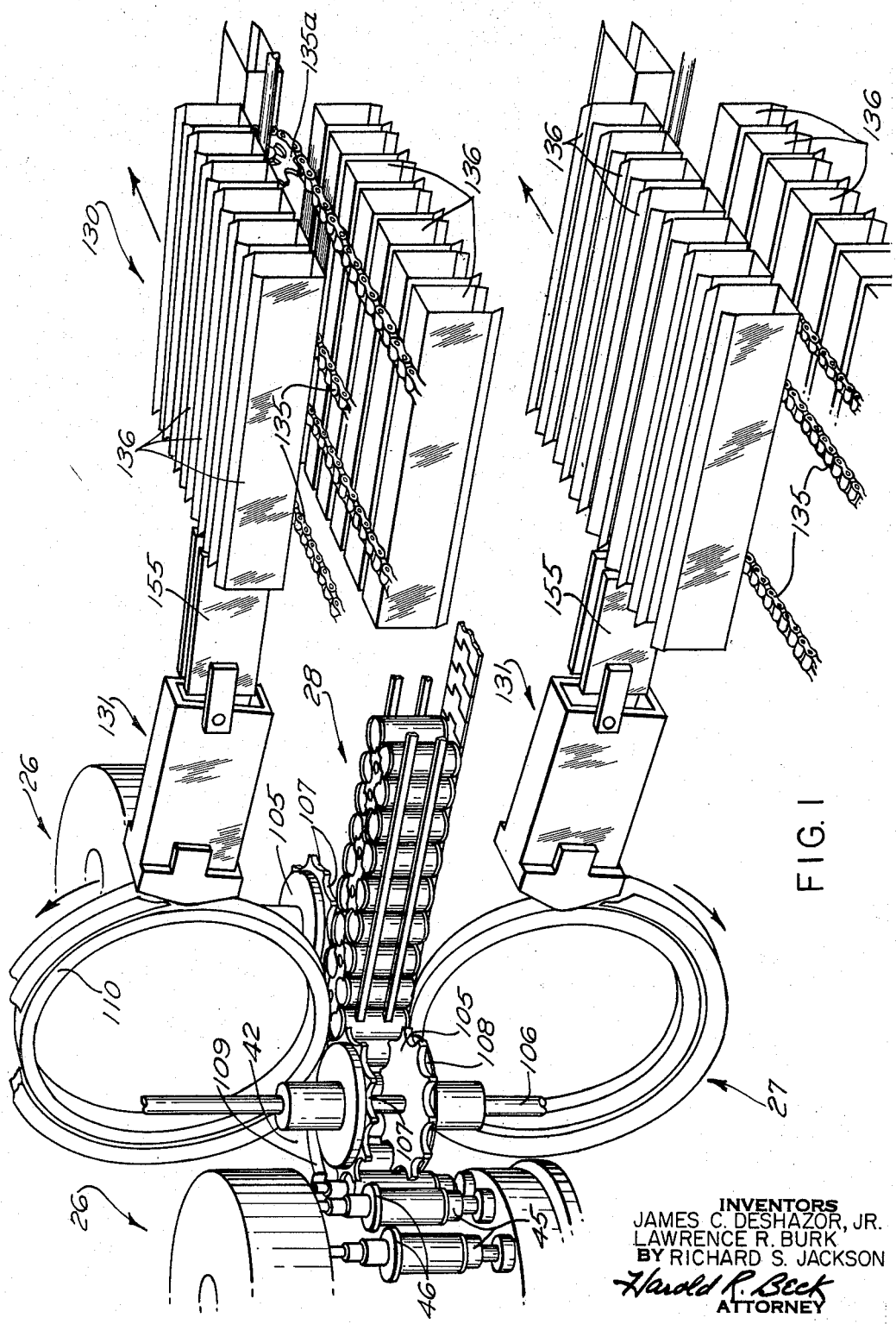
Figure 2:
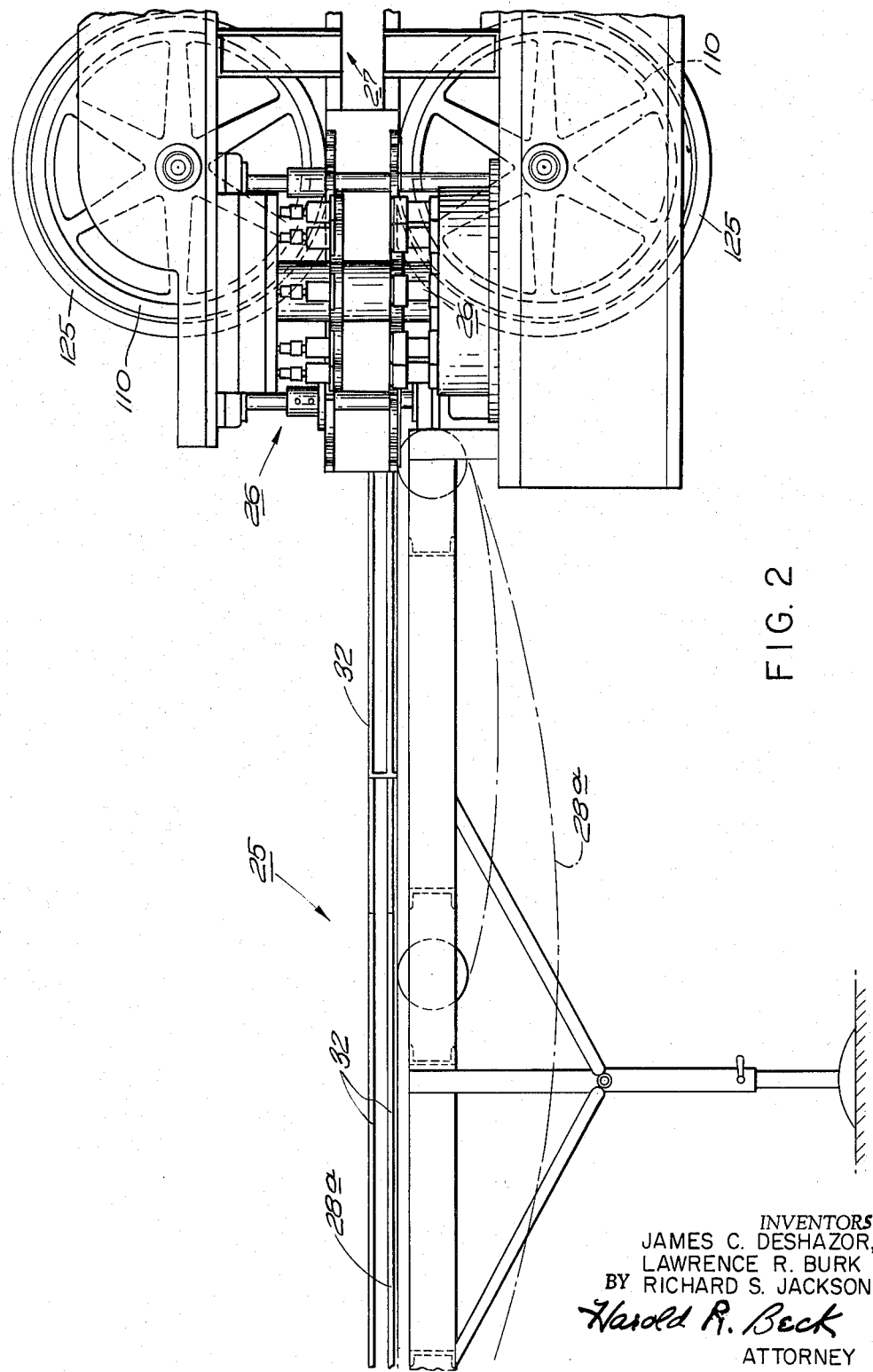

The clip usable in the apparatus and method of the present invention is completely and adequately described in the aforementioned patent applications and will not be described in detail herein. This clip comprises a single body of plastic having suitable strength and flexibility, for connection with two or more containers to form an interlocked multiple-container package. The clip is particularly constructed to interlock two, three, four or six symmetrically arranged, substantially tangentially abutting cans having a peripheral bead or chime at either or both the top and bottom ends of the cans. The description herein particularly is directed to a clip used to interlock six symmetrically arranged, substantially tangentially abutting cans but it is within the scope of this invention to utilize the concept stated herein for interlocking other multiples of cans to form packages.

The method according to the present invention includes the steps of feeding a procession of the containers along a primary feed path, diverting some of the containers from the primary feed path to a secondary feed path, diverting additional containers from the primary feed path to a tertiary feed path, continuing to feed the containers along the feed path, orienting some of the containers to a predetermined position while being fed along the secondary feed path, orienting the additional containers to a predetermined position while being fed along the tertiary feed path, then joining the oriented containers from the secondary and tertiary feed paths to form a procession of containers having a width of two containers, and periodically and systematically uniting a plurality of the containers in the last mentioned procession to form individual packages. Ancillary to this primary method are the steps of orienting the containers by individually rotating each container about a vertically disposed axis passing through each container and thereafter arresting the rotation when each can has reached the predetermined position.

The containers are united to form packages by tightly engaging top portions of each container with the unitary plastic clip as hereinbefore described. This clip has downwardly extending can chime engaging portions which are positionable on opposite sides of the chime of each can at its upper end and one of the portions has a hooked part engageable beneath the chime. The clips may be affixed to either or both ends of the cans. The clips are preferably moved in a continuous path tangential to the upper end of the upper end of the cans and in timed relation with the rectilinear movement of the cans through the uniting station.

In the preferred form of this invention the cans are moved in a circular path onto an orienting station, which also operates in a circular path during orientation of the containers, and then in a circular path from the orienting station for deposition into a path moving rectilinearly through a clip application station. The application of clips to the chimes of the cans is performed primarily while the cans are moving in the rectilinear path and while the cans are almost or substantially in chime-abutting relationship to each other (both transversely and longitudinally of the package).

The clip usable in this invention is constructed with lower cam surfaces to adjust and compensate for variations in the positioning of the cans during the clipping operation and the surfaces can shift the can positions slightly to effect clip application with minimum plastic stressing. The plastic material from which the clip is fabricated also compensates for various malpositioning of the cans at the clipping station, if such should occur, since the plastic is resiliently flexible to withstand some distortion without permanent deformation. Thus, the criticality in the positioning of the cans at the clipping station is minimized within the operable scope of this method and apparatus due to the construction of the clips. This minimal criticality is important from the operator's and the user's standpoint since maintenance and machine stoppage is minimized.

The apparatus according to the present invention has means for performing the various functions described above with respect to the method and is particularly designed to move the cans in various circular paths as noted which provides for a high-speed operation achieving rapid functional transfers of the cans while minimizing the possibility of damage to the cans or the indicia located on the sides of the cans.

A particularly important sub-assembly invention herein includes the method and apparatus for orienting the cans, including: rotating the cans, stopping the rotation of the cans in a desired position, and continuing the movement of the cans along the feed path while this orientation is being accomplished.

Referring specifically to FIGURES 1–4, the present invention includes a machine having a can infeed section 25 which divides the incoming cans into two infeed rows, an orientation section 26 for each of the rows, a clipping station 27 and an outfeed section 28.

The infeed section 25 includes a continuous conveyor 28A which supplies cans to a diverter 29 to separate the cans into two separate single line rows of cans 30 and 31 on separately driven conveyors. All of the conveyors have suitable side rails 32 which maintain the cans on the conveyors. The two single rows of cans 30 and 31 are then directed through identical paths and therefore only one will be described herein.

Figure 5:
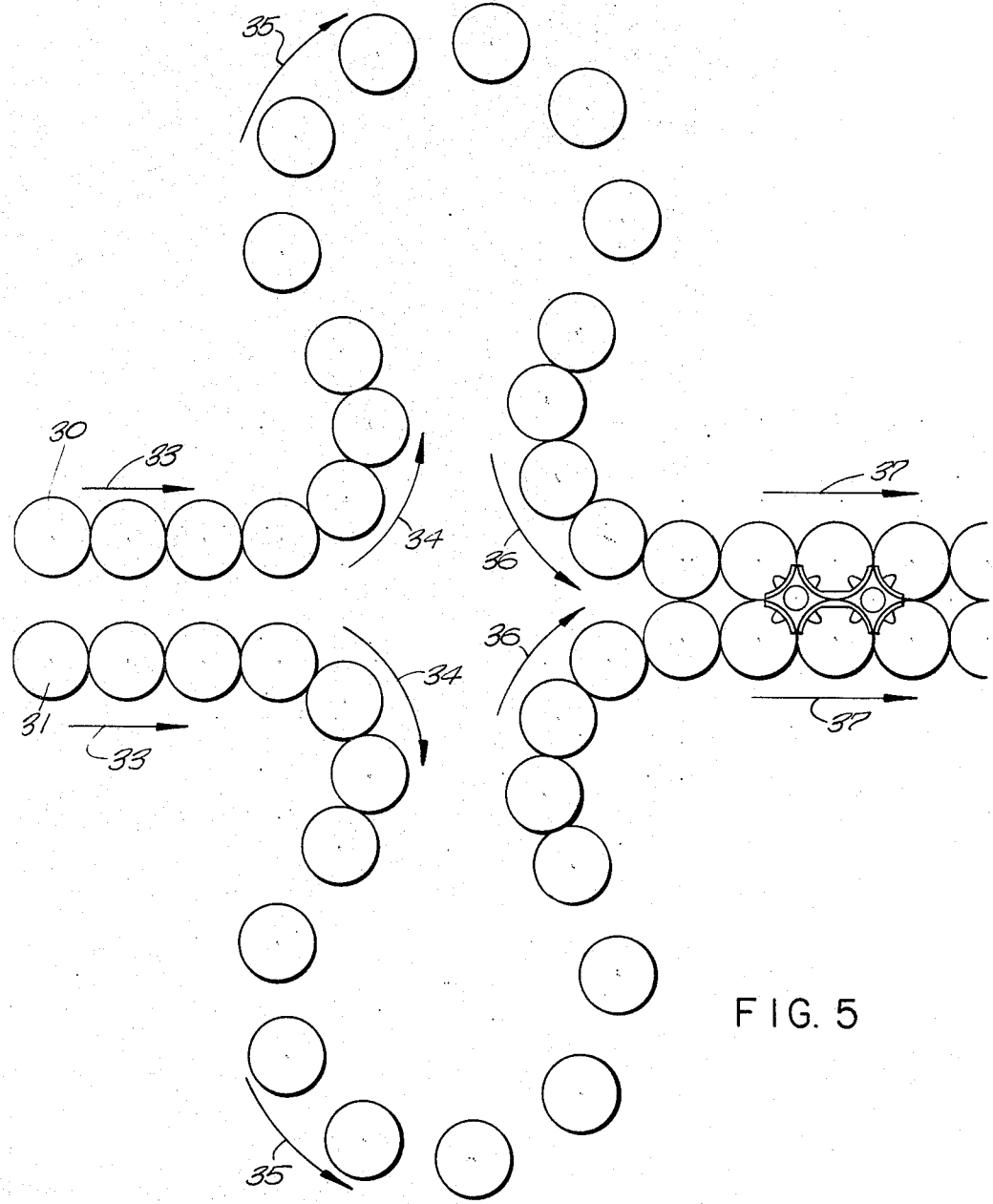

Referring to FIGURE 5, the cans in each line are fed inwardly from left to right in the direction of the arrows 33, in a circular path at an infeed star wheel in the direction of arrows 34, in a circular path at the orienting station in the direction of arrows 35, in a circular path at an output star wheel in the direction of arrows 36, and then in a straight line (rectilinear) direction as shown by arrows 37 through the clipping station and outfeed of the finished clipped package. The clips are applied to the cans at about the line X—X.

Figure 6:
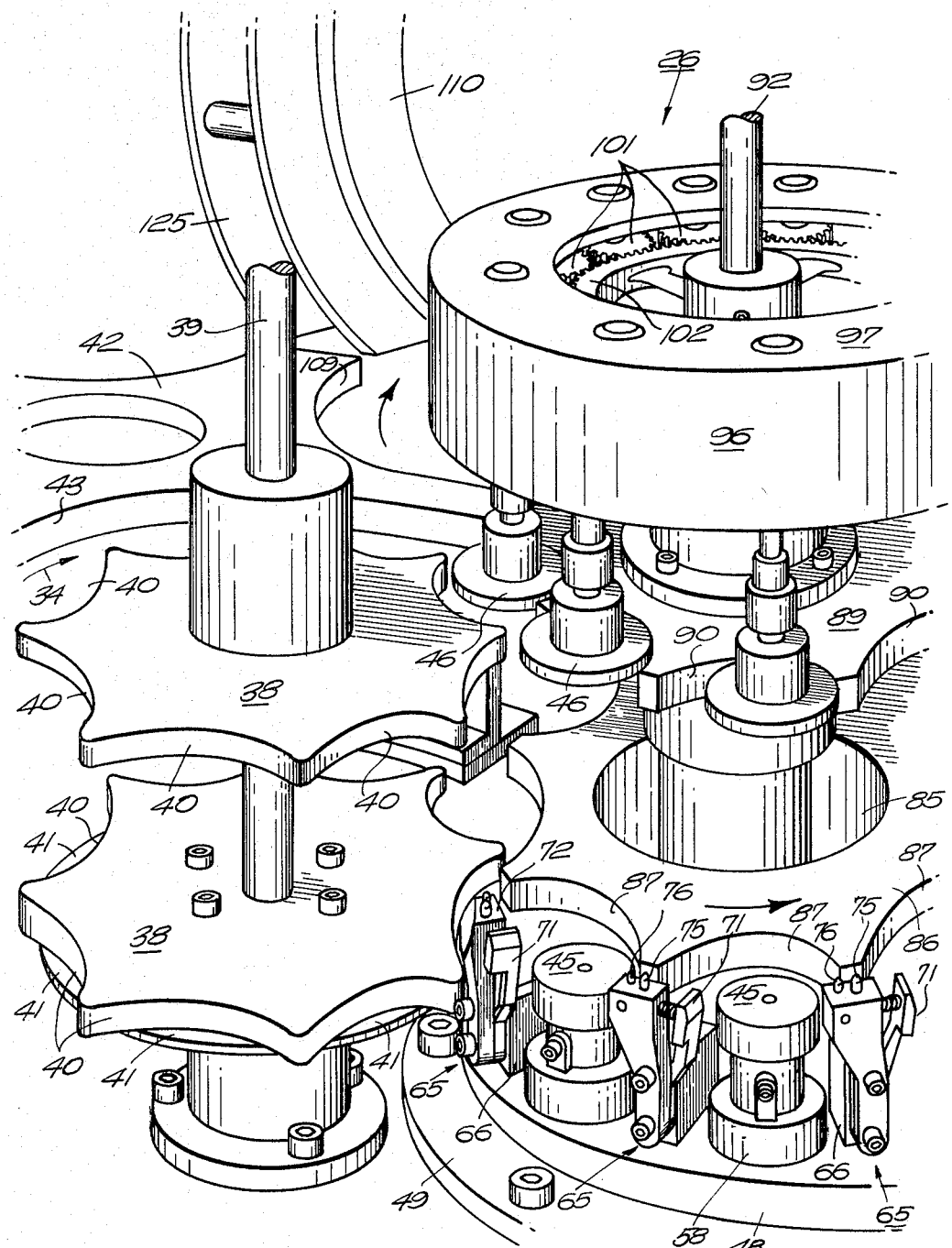

Referring to FIGURE 6 the cans are fed in from left to right around a pair of driven spaced star wheels 38. The star wheels are affixed to and paced from each other on a driven shaft 39 and are adjustable thereon to adjust for various heights of cans. The rows of cans 30 and 31 are subjected to a can feed pressure which moves the cans individually into pockets 40 of the star wheels 38 and the cans are picked up for circular movement by a continuous circular shelf 41 located immediately below the bottom star wheel 38. The pockets 40 are formed by scalloped portions in the periphery of the star wheels 38. The star wheels are spaced sufficiently far apart so that the vertical faces of the scalloped portions are engaged only by the chimes of the cans thereby avoiding any marring contact between the star wheels and the printed indicia or labels on the side walls of the cans.

A stationary plate 42 is positioned between the star wheels 38 on each side of the machine and has circular cut-out peripheral portions 43 spaced a distance from the pockets 40 of the star wheels to permit a can to be disposed between the pocket and the face 43 of the plate. The plate 42 is at an elevation such that the face 43 only engages the chime of the can to avoid marring the can. Thus as the star wheels 38 are rotated, the individual cans are held on their bottoms by shelf 41 and held at their top ends between the face of pocket 40 and face 43 of plate 42, to be conveyed in the circular motion as shown by the arrow 34 in FIGURE 5. The star wheels 38 are the infeed for the orienting unit 26.

As the star wheels 38 rotate, the cans are carried on the plate 41 with the upper chime of the can sliding along the face 43 of plate 42. The individual cans are brought around to the right side of the star wheel (as viewed in FIGURE 6) and the individual can is picked up by the orienting unit 26 in the manner to be described hereinafter.

Referring to FIGURES 6–9, the orienting unit 26 includes a bottom housing 47 rigidly affixed to the frame of the machine by bolts and containing a hollow annular cavity 48 having a first circular cam track 49 opening outwardly and a second circular cam track 50 opening inwardly. Each cam track 49 and 50 is circular, integral with the base plate 47 concentric, and has a continuous captive cam groove 62 therein.

The plate 47 has an upwardly extending tubular housing 51 surrounding a centrally disposed rotatable driven (arrow 35 of FIGURE 5) shaft 52.

The upper end of shaft 52 has an integral flange 54 rotatable on a bearing 55 interposed between the flange and housing 51. The flange 54 is integral with a circular, outwardly extending chuck base plate 56. The base plate 56 has a plurality of vertical openings 57 which receive a bushing 58 suitably held in place by snap rings or the like. A chuck mounting rod 59 is keyed for vertical reciprocation in the bushing 58. A lower chuck 45 is mounted on the upper end of the chuck rod 59 and is rotatable on bearings 60. A cam follower 61 is rotatably mounted on a transverse axle at a lower end of the chuck rod 59 and is captively held within and rotatable along the cam groove 62 in the cam plate 50. The surface of the cam groove 62 undulates to raise and lower the lower chuck 45 in the manner to be described hereinafter. Thus as the plate 56 is rotated (upon rotation of shaft 52), a plurality of chucks 45 and chuck rods 59, etc. are simultaneously rotated in a circular path as shown by the arrow 35 in FIGURE 5 and the chucks are raised and lowered as the individual cam follower 61 follows the cam groove 62. There are nine chucks 45 in the preferred embodiment shown.

Immediately adjacent each chuck 45 is a can feeler unit 65. Each can feeler unit (see FIGURES 8, 9 and 9A) includes a mounting block 66, disposed in a radial slot in plate 56, having a downwardly disposed rod 67 reciprocally mounted in an opening 68 in the plate 56. Block 66 is biased away from plate 56 by spring 68A. A cam follower 69 is rotatably mounted on a transverse axle at the lower end of rod 67. The cam follower is captively held within and rotatable along the cam groove 70 in the cam plate 49. The lower surface of the cam groove 70 undulates to raise and lower the can feeler for the purpose to be described hereinafter. An upstanding backing plate 71 is integrally fixed to the outer radial face of the mounting block 66 and a movably mounted can feeler bar 72 is mounted to the outside of the backing bar 71. A spring 73 is interposed between the backing bar 71 and the can feeler bar 72. The can feeler bar 72 has small horizontal slots which receive beaded bolts 74 threaded into the mounting block 66 thereby permitting bar 72 to move toward and away from chuck 45 and backing bar 71. The can feeler mounting bar 72 has a pair of spaced pins 75 and 76 protruding from its upper surface.

As shown in FIGURE 9A, the pin 76 is positioned inside the chime 80 of the can and the pin 75 is positioned outside the chime 80. Thus, the chime 80 is captive between the two pins. As the can is rotated (in a manner to be described) the bar 72 and pins 75 and 76 can move inwardly and outwardly toward and away from the backing plate 71 against the biasing effect of the spring 73. Thus, if the can is not perfectly centered on the chuck 45 or is slightly out of round, the sensing device can follow the eccentricity of the chime.

All steel cans having a vertical seam with crimped top and bottom ends, has a protruding bump 81 on the chime at the location of the seam, as shown in FIGURE 8. This bump is caused by the seam which is enclosed within the crimped portion of the end crimped to the side wall of the can and the bump normally extends .008–.012″ out from the chime. The distance between the inner faces of pins 75 and 76 is sufficient to pass the normal width of the chime but not sufficient to pass the width of the chime at the point of the bump 80. Thus, when the can is rotated, the bump 81 moves against the pin 75 in the manner shown in the right hand portion of FIGURE 8 and the rotation of the can is stopped. Since the sensing device 65 may be positioned at a variety of positions along the periphery of the chuck 45, the can can be oriented to any desired position. With the sensing device in the position shown in FIGURES 8 and 9, the vertical seam (coextensive with the bump 81) of the can is disposed inside the six pack package at the clipping station so that the brand name or trademark on each can is disposed outside the six pack.

Figure 7:
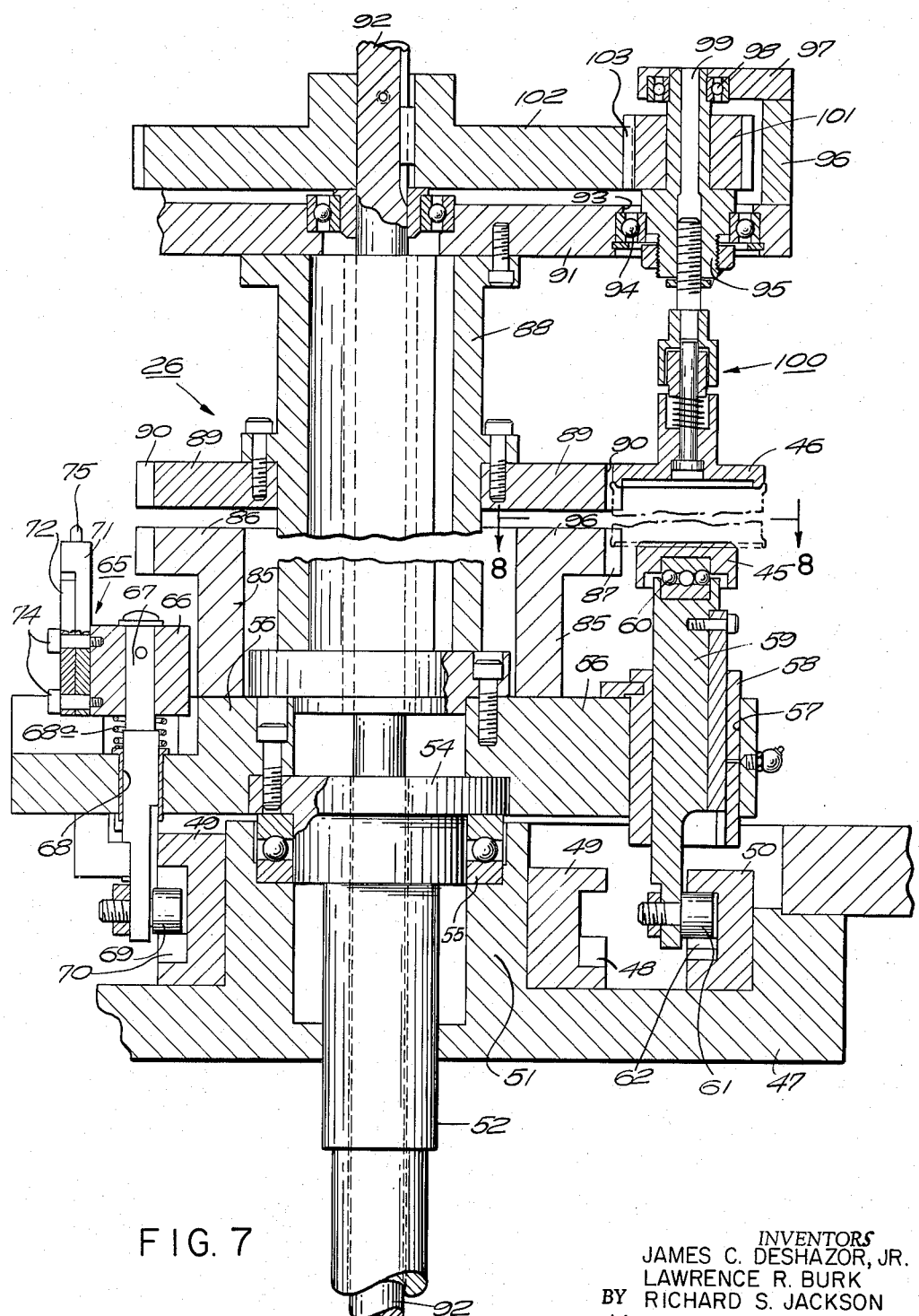

Referring to FIGURE 7, a tubular, vertically extending sleeve 85 is affixed to the upper face of plate 56, concentric with shaft 52, and has an integral star wheel 86 affixed to its upper end. The wheel 86 has peripheral pockets formed by scalloped surfaces 87 located immediately adjacent the top surface of chuck 45. The lower chime of the can positioned on chuck 45 slidably engaged against the surface 87 adjacent the chuck, thus concentrically aligning the can on the chuck 45. The star wheel 86 is rotated with shaft 52 and plate 56. A tubular, vertically extending housing 88 is affixed by a flange to the upper face of the plate 56 and rotates concentrically with the shaft 52 and plate 56. A second star wheel 89 is affixed to and extends outwardly from the housing 88 and has peripheral pockets formed by scalloped surfaces 90 which are coplanar with the scalloped surface 87 of the lower star wheel 86. The upper chime of the can engages the surface 90 of the upper star wheel 89 when the can is positioned on the lower chuck 45.

The upper end of housing 88 is affixed by a flange to a circular, radially extending top chuck mounting plate 91 which is rotatable concentrically with shaft 52. A stationary central shaft 92 passes downwardly concentrically through plate 91 and shaft 52.

The plate 91 extends outwardly over the chucks 46 and has spaced peripheral openings 93 which receive a bearing 94, held in place by suitable snap rings, which in turn rotatably mounts a gear bushing 95. The outer periphery of the plate 91 has an integral, upstanding circular plate 96 and an inwardly directed top leg 97. The upper end of the gear bushing 95 is rotatably received in a bearing 98 held within the underside of plate 97. A central shaft 99 extends downwardly coaxially through and is threadably attached to the gear bushing 95. The lower end of shaft 99 is attached to a slip clutch mechanism 100 which in integral with a top chuck 46. The gear bushing 95 has an integral planetary gear 101 housed between the plates 91, 96 and 97. A central sun gear 102 is keyed to the stationary shaft 92 and its outer teeth mesh with the teeth of each planetary gear 100.

As the plate 91 is rotated, by rotation of the shaft 52, the gears 101 rotates about their own axis and about shaft 92 as planetary gears about the sun gear 102 and thereby rotate each shaft 99 to drive the chucks 46 and the can positioned between the chucks 45 and 46. Whenever the bump 81 of the can is rotated into engagement with pin 75 on the feeler device 65 of the machine (see FIGURES 8 and 9A), the rotation of the can is stopped, and rather than have the top chuck 46 rotate on the top of the can with the possible scarring of the top surface of the can, the slip clutch 100 permits the shaft 99 to continue to rotate, but the chuck 46 does not rotate. Thus, the orienting unit moves in a circular path to orient the cans while the cans are moving along the feed path in the direction of arrow 35 in FIGURE 5.

The cans are then fed from the orienting unit to the outfeed on star wheel 105 for movement in the direction shown by the arrow 36 of FIGURE 5.

The outfeed star wheels are mounted on and driven by a shaft 106 and are spaced from each other such that the peripheral pockets formed by the scalloped surfaces 107 engage only the chimes of the can in the same manner as the infeed star wheel to avoid marring the vertical side surfaces of the can. The outfeed star wheels are substantially identical to the infeed star wheels except that the outfeed wheel has 11 pockets and the infeed wheel has 9 pockets. A circular 108 is disposed immediately below the lower star wheel 105 and as the chuck 45 is lowered during movement around the orienting station, a can is deposited on the plate 108 within the scalloped surface 107 of each star wheel. The chime of the can disposed away from the scalloped portion engages against a vertical curved surface 109 of the plate 42 in the manner shown in FIGURE 10. Thus each can is loosely captive between the surface 107 and the surface 109 and is moved in a circular path as shown by arrow 36 in FIGURE 5 to form a double can row for movement through the clipping station.

Figure 3:
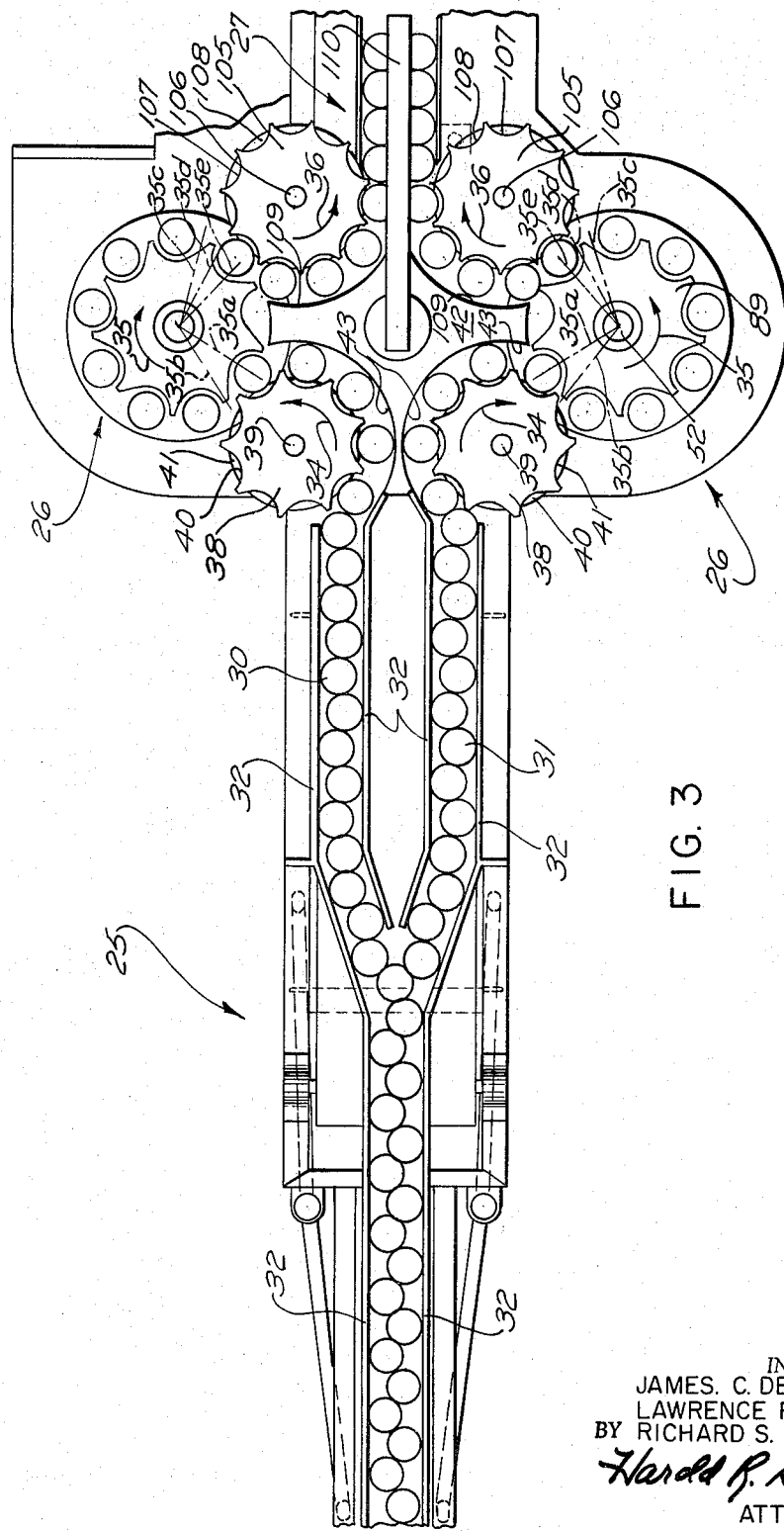
Figure 4:
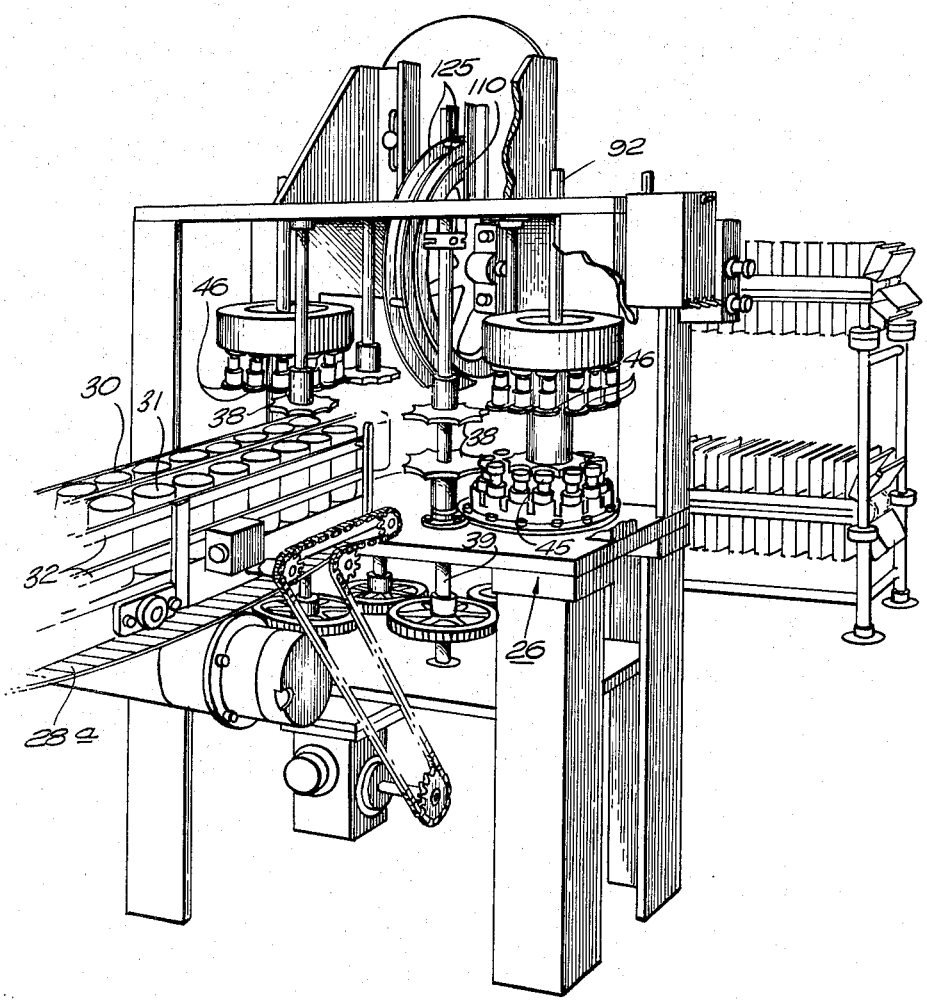

Referring to FIGURE 3, the cans are fed from left to right in the circular path (arrow 34) by being held captive between the pockets 40 and face 43 of plate 42 with the bottom of the cans supported by plate 41. When the cans reach the end of surface 43, designated 43A, the can enters the pockets in the orientation star wheels 39 and 86 and engage surfaces 87 and 90. At the time of initial entry into the pockets of the orientation star wheels, the cans are still supported by plate 41. At about the line designated 35A, the chucks 45 are individually elevated (due to the cam track surface 62 undulating upwardly and thus elevating cam follower 61 and chuck rod 59) to engage the bottom of the individual cans thereby elevating the cans until their top surfaces engage the underside of chuck 46 which is continuously rotating thereby commencing the rotation of the cans.

At about the line designated 35B, each feeler unit 65 is elevated (due to the cam track surface 70 undulating upwardly and thus elevating cam follower 69 and feeler rod 67) to move the pins 75 and 76 to the position shown in FIGURES 9 and 9A.

The can is then rotated until chime bump 81 engages against pin 75 (FIGURE 8) which stops the rotation of the can and slip clutch 100 permits the planetary gears 101 to continue to rotate but chuck 46 is stationary.

The cans are moved in a circular path (arrow 35) until they reach an area designated by line 35C at which point the chucks 45 are lower (due to a downward undulation in cam surface 62 in the manner previously described). The chucks are lowered only a distance sufficient to lower the top of the cans out of contact with the top chuck 46. The cans continue to move to an area designated by line 35D where the feeler units are lowered (due to a downward undulation in cam surface 70 as in the manner previously described) to remove the pins 75 and 76 from contact with the can chime. The cans cannot rotate at this point since they have previously been removed from contact with driving chuck 46.

The cans continue to move to an area designated by line 35E where the chucks 45 are completely lowered (due to an additional downward undulation in cam surface 62 in the manner previously described). The lower circular plate 108 (FIGURE 10) on the outfeed star wheel 105 is located immediately below and to one side of the chucks 45 at line 35E; therefore when the chucks 45 are lowered at line 35E the cans are deposited on plate 108 and within the pockets of star wheels 105. The cans then continue to move into engagement with surface 109 of plate 42 and are captive between this surface and surface 107 of the wheels 105.

The clipping station 27 includes a driven top clipping wheel 110 and a driven bottom clipping wheel 111. The clip is preferably applied to the cans at the point where the cans are tightly held by the star wheels 105 in directly opposed positions, generally designated by line X—X of FIGURE 5. The clipping wheels can be positioned forward of the machine (toward the right as viewed in FIGURE 10) so that the clipping occurs slightly ahead of line X—X; or the wheels can be positioned to clip at different positions other than directly opposed vertical positions.

FIGURE 11, which is a cross section taken on line 11—11 of FIGURE 10, illustrates the cans at the point of clipping and held by rigid stationary support bars 112 underlying the cans and top stationary leveling bars 113 engaged against the top of the cans. These bars prevent vertical displacement of the cans during clipping.

A rigidly mounted, but resilient divider plate 114, preferably fabricated from Teflon or the like is positioned between the cans at the clipping station to slightly space the chimes of the cans as shown in FIGURE 11, to insure proper application of the bottom clip 115 and the top clip 116. The clipped packages of cans are then conveyed away from the clipping wheels by a conveyor 117 and the packages are held in position by side rails 118.

In clipping impact extruded cans which have a chime on only one end, a clip is applied only to the chime and (see FIGURE 23) and thus only one clipping wheel is utilized in applying the clips. The other wheel is modified with peripheral bumps which are constructed and arranged to extend into the dished bottom of the cans to stabilize the cans during clipping.

The upper and lower clipping wheel 110 and 111 are substantially identical in construction; therefore, only one will be described herein. The clipping wheels are driven at a speed conforming to the speed of movement of the cans between the clipping wheels, and have a smooth peripheral surface with spaced buttons 120 affixed thereto. The buttons are affixed in pairs having a spacing equal to the spacing between the holes in the clips or about one can distance, such that a single clip is positioned on each pair of buttons. The spacing between the clips positioned on the periphery of the wheel is equal to the spacing required for affixation to the cans moving between the wheels or about two cans distance between the end buttons of each pair.

A pair of stationary spaced guide rails 125 (see FIGURE 12) are positioned along the periphery of each wheel, both upper and lower, and extend from a clip feed position 126 to about the point of application of the clips to the cans. The guide rails 125 are shown in FIGURE 12A and it is seen that the clips are slightly transversely bent by slideable engagement with the inner radial surfaces of the guide rails to hold the clips on the buttons 120 of the clipping wheels 110 and 111. As the clips are moved to position of application on the cans, the guide rails 125 feather to a fine point 126 to maintain the clips slightly curved transversely and longitudinally up to the point of application of the clip to the can. This avoids a premature application of the clip before the cans are in position between the clipping wheels.

At the clip feed station 126, the guide rails 125 extend outwardly from the periphery of the clipping wheel to provide radially extending finger portions 127 (see FIGURE 17).

Figure 13:
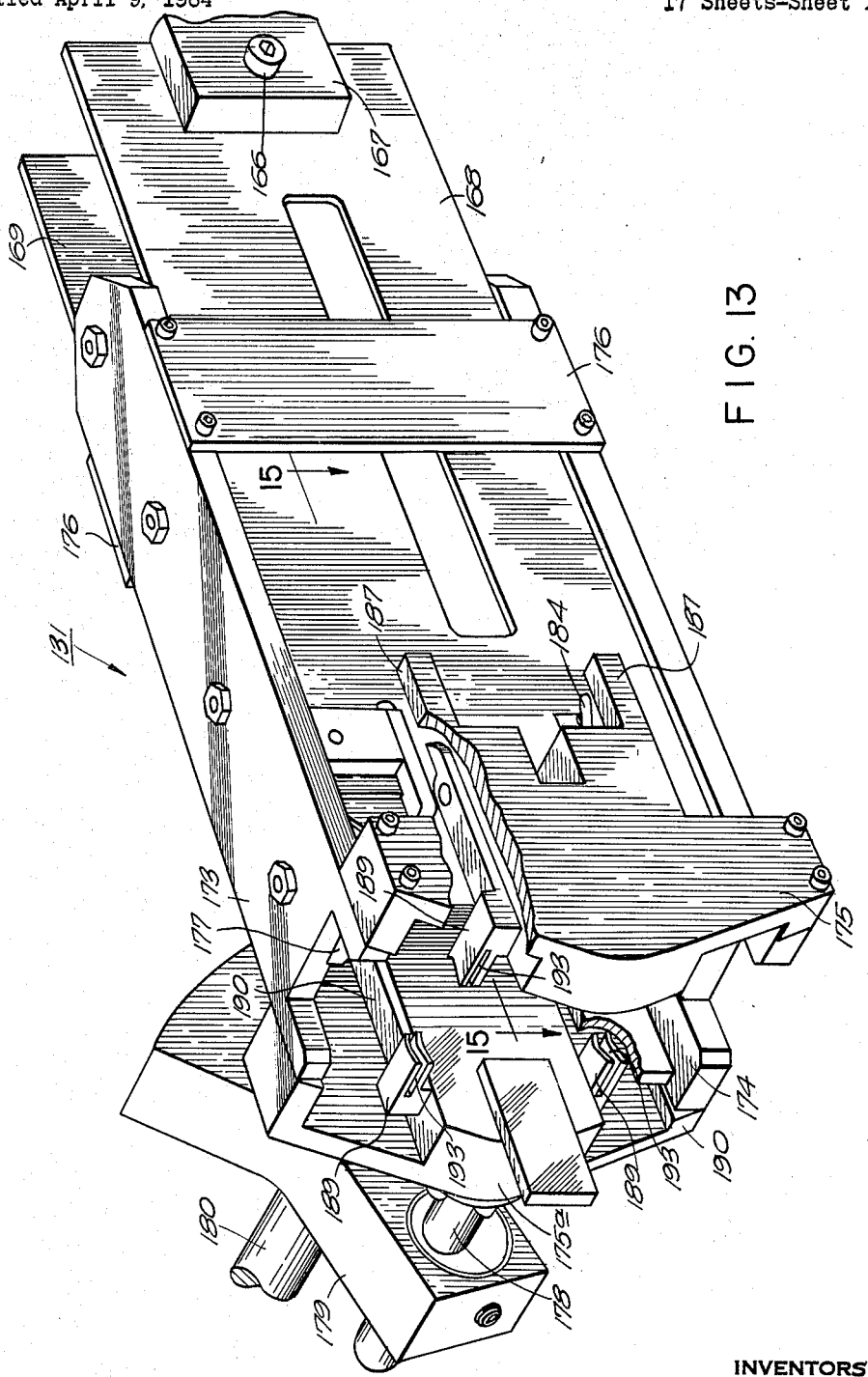
Figure 14:
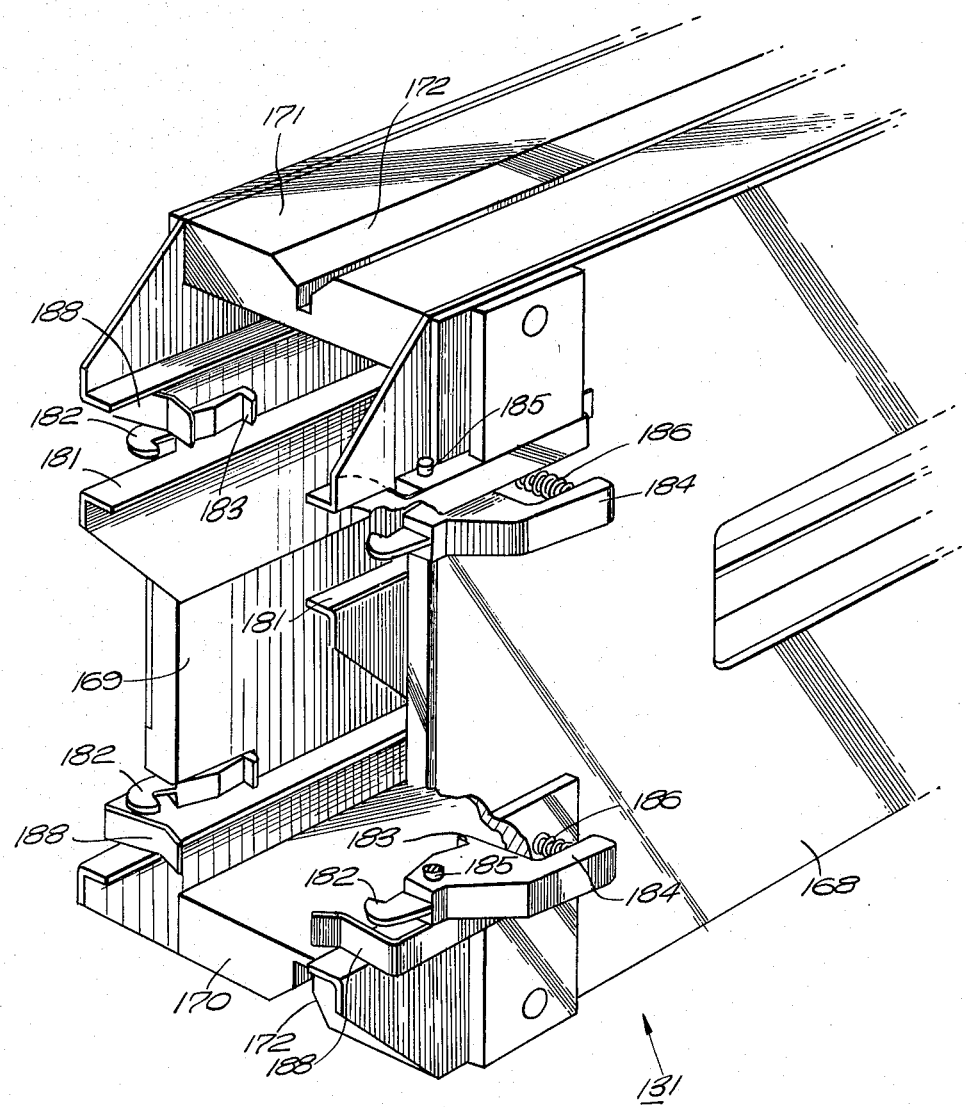
Figure 15:
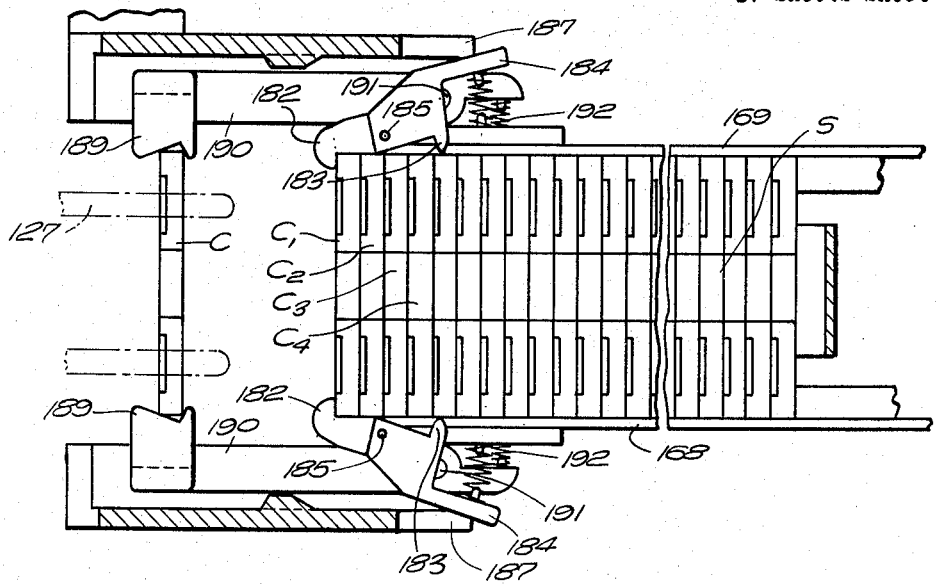

The clip feeding mechanisms for placing the clips on the clipping wheels 110 and 111 are basically the same in construction and therefore only one will be described herein. The clip feeding system includes a clip pusher system 130 as shown in FIGURES 1 and 15 and a clip placement magazine 131 as shown in FIGURES 13 and 14.

The feeder system includes a pair of spaced continuous chains 135 intermittently driven by and around sprockets 135a to move the chains in a generally rectangular path with curved ends. A plurality of longitudinally extending U-shaped channels 136 are affixed in parallel along the chains 135. A longitudinal stack of clips is positioned in each channel 136 by being suspended by upper in-turned flanges 137 of the channels in the manner shown in FIGURE 18B. The channels 136 are filled with clips manually by an operator and the clips C are disposed with the chime gripping portions of the clips facing toward the right in FIGURE 18 and away from the clipping wheels 110 and 111. The channels 136, when filled with clips C, are individually and periodically indexed to a position beneath a clip pusher mechanism (to be described) by a control mechanism not shown. This clip pusher mechanism is shown in FIGURE 18 and includes a stationary frame 140 and 141 which supports a pair of spaced driven chains 142 and 143 passing around sprockets 144 to move in a generally rectangular path. The sprockets 144 and associated chains are driven by a motor with a slip clutch so that when the pusher means is engaged with the clips, the clutch slips and thereby provides a constant pushing pressure on the clips C. Each of the chains 142 and 143 have a pusher means including a pusher finger 145 extending outwardly at right angle from the chain and affixed to a mounting block 146 which is pivotally mounted to the chain by pins 147 and 148. Pin 147 is slideable in a slot 149 in the mounting block so that the finger 145 follows a substantially vertical path (see dashed lines in FIGURE 18A) during movement of the chain and finger around the sprocket 144.

A solenoid operated hold-up mechanism 150 is operable to stop one of the pusher fingers 145 when it is not being used for pushing a stack of clips into the machine. The mechanism 150 includes a solenoid 151, with suitable electrical corrections and controls, which moves a stop bar 152 to and from a position in the path of movement of the fingers 145 when they are disengaged from the stack of clips in the channel 136.

Thus, after the channels 136 are filled with clips, a filled channel is automatically indexed into a position immediately underlying chains 142 and 143. The channels are indexed by driving the sprockets 135a through activation of the driving motor by suitable controls, not shown, which are triggered by one of the fingers 145 during vertical movement as shown by the dashed lines in FIGURE 18A. The pusher finger 145 on chain 142 is then moved into contact with the outermost clip in the stack in channel 136 by an automatic activation of the driving motor for sprocket 144 to propel the chain 142. The finger continues to exert a constant feed pressure on the clip stack while the clips are being fed from the channel 136 to a bridging channel 155 which feeds the clips to magazine 131. As soon as the clips are exhausted in channel 136, the finger 145 on chain 142 starts a vertical withdrawal movement around sprocket 144, as shown in dashed lines in FIGURE 18A. The sprocket 144 is positioned partly over channel 155 so that all of the clips are removed from channel 136 before the finger completes its vertical withdrawal. During this entire cycle, the finger 145 on chain 143 has been held by the mechanism 150 in the position shown in FIGURE 18. During the vertical withdrawal of finger 145 on chain 142, a control mechanism (not shown) is triggered which indexed a full channel 136 into position beneath chains 142 and 143, and a second control mechanism (not shown) is triggered which activates solenoid 151 to move the stop bar 152 toward the right in FIGURE 18 to release finger 145 on chain 143 and simultaneously activate the drive motor for sprocket 144 to move chain 143 and its associated finger until the finger engages the outermost slip in channel 136 to push the clips into the bridging channel 155. Thus, the entire cycle is repeated since the solenoid 151 is automatically deactivated to move stop bar 152 into the path of finger 145 on chain 142 to stop the finger movement until the start of the next cycle. The motors driving sprockets 144 may be continuously operating due to their slip-clutch attachment to the sprockets, thus avoiding activation and deactivation of the motors.

The feed magazine 131 is mounted for vertical swinging movement on a pin 166 slidably received in a bracket 147 affixed to the stationary bridging channel 165.

The feed magazine 131 includes an inner feed chute as shown in FIGURE 14 which has side walls 168 and 169, bottom wall 170 and top wall 171. The top and bottom walls have central longitudinal grooves 172 which slidably support the inner chute within an outer chute having a top wall 173, bottom wall 174, side wall portions 175, 175a, and rear brackets 176. The top and bottom walls 173 and 174 have guide rails 177 fitted into and slidable within the slots 172 of the inner chute. Thus, the inner chute is longitudinally reciprocal with the outer chute.

A transversely extending shaft 178 is integral with side wall portion 175a and swingably mounted on a crank arm 179. The other end of the crank arm 179 is fixed to a driven shaft 180. As the shaft 180 rotates, the crank arm 179 and shaft 178 move in a circular path (designated 181 in FIGURE 17) thereby moving the entire outer feed chute in this circular path with the inner chute pivoting vertically about the pin 166. The outer chute is slid fore and aft (relative to wheel 110) on the inner chute during movement in this circular path.

The clips are pushed through the inner chute or guide rails 181 which maintain the clip in aligned vertical position the same as in channels 136.

An escape mechanism is provided at four spaced points on the front end of the inner chute and includes a front hook-shaped member 182 integral with a rear hook-shaped member 183 and having an integral cam arm 184 which extends outwardly of the side wall of the inner chute. The entire escape mechanism is pivoted about a pin 185 and the cam arm 184 is normally biased outwardly by a spring 186 to assume the position shown in FIGURE 15. Thus the hook-shaped member 182 is normally biased inwardly and the hook-shaped member 183 is normally biased outwardly with respect to the inside face of the side wall of the inner chute.

Figure 16:
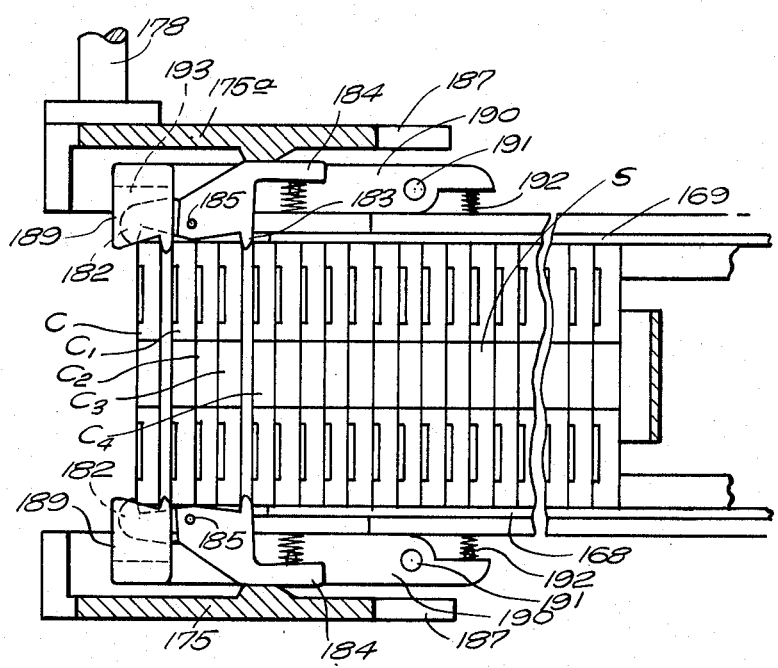

The outer chute (see FIGURE 13) includes cam plates 187 which engage the outer surface of the cam arms 184 during reciprocal motion of the outer chute on the inner chute, thereby camming the escape mechanism inwardly to the position shown in FIGURE 16 and moving the hook-shaped member 183 inwardly and the hook-shaped member 182 outwardly relative to the clips in the inner chute.

The distance between the hook-shaped member 182 and 183 is only sufficient to include four vertically disposed clips $C_1$-$C_4$ and four spring members 188 aid in holding the clips in a vertical position.

The outer chute has four spaced fingers 189 positioned at the front of the chute and affixed to arms 190 pivoted on pins 191 affixed to the side wall portions 175 and 175a. Springs 192, captive between arm 190 and side wall portions 175 and 175a, normally bias the fingers 189 inwardly of the inner face of the side wall portions as shown in FIGURE 15. Each of the fingers 189 has a horizontal slot 193 sufficiently wide to receive the hook-shaped member 182 when the fingers overlie this member as shown in FIGURE 16.

The outer chute is moved in the circular path 181 (FIGURE 17) carrying a clip C below the lower end of extensions 127 of guide rails 125. The movement of wheel 110 is synchronized with the delivery of clip C so that pins 120 are in position to enter the openings in the clip and move the clip beneath the guide rails 125 to the clipping position. The clip C is picked up from the clip stack S with the magazine 131 as follows: assuming that the magazine has just delivered a clip to the wheel (position shown in FIGURE 15 but without the designated clip C within fingers 189), the shaft 180 is rotated (this shaft is continuously rotating during operation of the machine) to move the magazine through the upper half of its circular path 181—which moves the outer chute from the FIGURE 15 position to the FIGURE 16 position—thereby causing the cam plates 187 to engage the cam arms 184 to pivot the member 183 inwardly and the member 182 outwardly while simultaneously positioning the fingers 189 over member 182 (FIGURE 16 position). The fingers 189 snap over and hold the frontmost clip C by swinging the arm 190 against spring 192. The hook-shaped member 182 is in the outwardly retracted position thereby permitting removal of clip C from the escape mechanism, while the hook-shaped member 183 is in the inward advanced position thereby relieving the clips in the escape mechanism from the clip pusher feed pressure. The shaft 180 continues to rotate to move the magazine 131 through the lower half of the circular path 181, thereby moving clip C below extension 127 to the position shown in FIGURE 15 at which point the clip is positioned on pin 120. The clip is snapped out of the fingers 189 as the magazine commences the upper half of the circular path since the clip is trapped between the wheel 110 and the extensions 127. The supply of four clips within the escape mechanism is replenished from the stack S during the cycle since the hook-shaped member 183 is retracted outwardly as shown in FIGURE 15.

FIGURES 19 and 20 illustrate a modified form of clip feeder having a continuous chain 200 which is indexed in the manner hereinbefore described and having a plurality of parallel channels 201 affixed thereto. The clips are disposed within the channels in the manner shown in FIGURE 20. In place of the pushers as shown in the previous figures, there is provided a continuous screw 202 rotatably driven by a motor, not shown. The tabs 203 of the clip are engaged in the threads of the screw 202 and move the clips in the direction of the arrow 204 of FIGURE 16. The channel 201 can index below the screw 202 and its support 205. As noted, the clips are moved from the channel 201 into the bridging channel 155 and as soon as the clips in the channel 201 are exhausted and (left of the channel 201) beyond the split 206, the chain 200 is moved to index the next full channel 201 into position and bring the clips C in the indexed channel 201 against the screw 202. A slight time lapse occurs in indexing the channels, therefore, the last clip in bridging channel 155 will have moved toward the left in FIGURE 19 and it is necessary to have an immediate speed up of the rotation of the screw 202 to bring the new stack of clips in the channel 201 into contact with the clips in bridging channel 155. The speed up of the screw 202 can be accomplished in the normal manner by having a slip-clutch in the drive mechanism so that the screw can operate at a higher speed when under a lesser load and upon the indexed clips coming into contact with the clips in bridging channel 165 the clutch commences to slip and the feed of the clips is substantially even and continuous.

FIGURE 21 illustrates an auxiliary portion of the equipment adapted for encompassing the clipped package within a plastic film enclosure. The plastic film is preferably a polyolefin such as polyethylene. An auxiliary conveyor 215 moves the clipped six-packs P from the clipping apparatus previously described. The conveyor 215 has integral spaced blocks 216 thereon with upwardly projecting buttons 217. The packs P are positioned with the buttons 217 extending into the openings in the bottom clip or into the spaces between the cans if the pack is only clipped on the upper surface. Thus the pack is elevated above the surface of the conveyor thereby permitting the plastic film to enclose part of the bottom of the pack P in the same manner as illustrated on the top of the pack.

The wrapped pack produced by the apparatus of FIGURE 21 is shown in FIGURES 22 and 23. Referring to FIGURE 22, the pack consists of a clip C attached to the upper chime end of the cans and a film overwrap W which has been shrunk onto the top, side and bottom of the pack P. An opening 217 is provided at the top and bottom of the pack and surrounds the clip C. This pack may have a clip on the top and bottom of the cans or only on the top.

FIGURE 23 illustrates a pack $P_1$ having the film W enveloping the pack and the clip C attached to the upper chimes of the cans. The cans 228 are the well-known impact extruded cans which do not have a lower chime or bead. Thus this pack has a single upper clip C and the enveloping film W to consolidate the pack and give it an aesthetic appearance.

The packs P in FIGURE 21 are moved by the conveyor 215 to a plastic feed station 218 which includes a roll of plastic film 219 on each side of the conveyor which feeds plastic film 220 parallel to the movement of the conveyor 215 and on each side of the conveyor. The height of the plastic film 220 is sufficient to provide film which can envelop below and above the pack P. The packs and films are conveyed to a heat sealer 221 consisting of identical units on each side of the conveyor and including continuous driven belts 222 moving in the direction indicated by the arrows and at the same speed as the conveyor, and radially extending paddles 223 on the belts and having heat sealing units, such as wires or electrodes, in their vertical outer edges 224. The heat sealing units are provided with suitable electrical connections and controls. As the belts 222 move in the direction of the arrows, the paddles 223 are swung around the ends of the belts (the left end of the belts as shown in FIGURE 21) to meet at 225 between the packs P thereby forcing the two sheets of film together between the packs. The heat sealing units 224 fuse the plastic film 220 together at juncture 225 as the packs and heat sealing unit move from left to right in the figure and simultaneously sever the enveloping plastic film tube 226 from the adjacent tube. Thus as the conveyor 215 moves the packs P from the right hand end of the heat sealing unit 221, the packs are individually supported on the blocks 216 and have a complete enveloping tube or sleeve of plastic film 226. The conveyor 215 then moves into a conventional shrink tunnel 227 wherein heat is applied to shrink the film around the pack P to produce a pack as shown in FIGURES 22 and 23.

While we have described the present preferred embodiment of our invention, it may be otherwise embodied within the scope of the following claims.

We claim:
1. A method of assembling a plurality of containers to form a package, comprising:
 (a) feeding a procession of said containers along a primary feed path in a first direction,
 (b) diverting some of said containers from the primary feed path to a secondary circular feed path,
 (c) diverting additional containers from the primary feed path to a tertiary circular feed path,
 (d) continuing to feed the containers along said feed paths,
 (e) orienting said some containers to a predetermined position while being fed along the secondary circular feed path,
 (f) orienting said additional containers to a predetermined position while being fed along the tertiary circular feed path,

(g) joining tangentially the oriented containers from the secondary and tertiary feed paths to form a procession of containers having a width of about two containers and, moving in said first direction, and, (h) periodically uniting a plurality of the containers in the last-mentioned procession to form a package while the containers are moving in said first direction.

2. A method according to claim 1 wherein:

(a) said oriented containers are joined from the secondary and tertiary feed paths in a circular movement to tangentially meet to form parallel rows, said circular movement tangentially meeting to release the containers from the circular movement into movement in said first direction, and, (b) substantially immediately uniting said parallel rows of containers, while the containers are moving in said first direction, to form separate packages having an even number of containers in each package.

3. An apparatus for assembling a plurality of containers to form a package, comprising:

(a) means for feeding a processing of said containers along a primary feed path in a first direction, (b) means for diverting some of said containers from the primary feed path to a secondary circular feed path, (c) means for diverting additional containers from the primary feed path to a tertiary circular feed path, (d) means to feed said diverted containers along the secondary and tertiary circular feed paths, (e) orienting means for receiving the containers on the secondary feed path and orienting each container to a predetermined position while moving along said path, (f) orienting means for receiving the containers on the tertiary feed path and orienting each container to a predetermined position while moving along said path, (g) means for receiving the oriented containers in a path tantengial to said circular paths from both of said orienting means and moving the oriented containers in a pair of parallel rows away from the orienting means and in said first direction, and, (h) means for uniting a plurality of said containers in the parallel rows to form a package while the containers are moving in said first direction.

4. An apparatus according to claim 3 wherein:

(a) said means for receiving the oriented containers includes:

(1) a rotatable mechanism to transfer said containers from the orienting means to the means for uniting a plurality of the containers; said rotatable mechanism moving each container in a substantially circular path to form a pair of substantially parallel rows of containers moving tangentially and rectilinearly in said first direction away from the rotatable mechanism, the containers in said rows being contiguous to each other and joining to form a single row, having two containers abreast, at the point of tangential abutment of the containers; and, (2) means for uniting the containers in said single row at about the point of tangential abutment of the containers.

5. An apparatus for assembling a plurality of containers to form a package, including:

(a) means for feeding a procession of said containers along a primary feed path;

(b) means for diverting some of said containers from the primary feed path to a secondary feed path;

(c) means for diverting additional containers from the primary feed path to a tertiary feed path;

(d) means to feed said diverted containers along the secondary and tertiary feed path;

(e) orienting means for receiving the containers from the secondary feed path and orienting each container to a predetermined position;

(f) orienting means for receiving the containers from the tertiary feed path and orienting each container to a predetermined position;

(g) each of said orienting means including:

(1) a horizontal table rotatable about a vertically disposed axis;

(2) a plurality of platforms mounted on and rotatable with said table, each platform being movable vertically relative to said table, said platforms being circumferentially, equally spaced from each other and equally from said table axis;

(3) a horizontal mounting unit spaced from said table and rotatable about and in unison with said table axis;

(4) a plurality of chucks rotatably mounted in said mounting unit, one of said chucks being positioned about each of said platforms;

(5) a motor mechanism on said mounting unit to rotate each of said chucks.

(h) means for receiving the oriented containers from each of said orienting means and moving the oriented containers in a pair of parallel rows away from the orienting means; and, (i) means for uniting a plurality of said containers of the parallel rows to form a package.

6. An apparatus according to claim 5, including:

(a) a stationary cam track, having an undulating surface, supported below said table;

(b) a rigid member affixed to the underside of each platform and extending downwardly and slidably through said table;

(c) a cam follower on the lower end of each rigid member, said follower being in engagement with the cam track so that the platforms move vertically, in accord with the undulations in the cam surface, as the table is rotated about its vertically disposed axis; and, (d) a container feeler mounted on said table adjacent each platform and engageable with a container positioned on the platform.

7. An apparatus according to claim 6 including:

(a) a second stationary cam track, having an undulating surface, supported below said table;

(b) a rigid support affixed to the underside of each feeler and extending downwardly and slidably through said table;

(c) a cam follower on the lower end of each rigid support, said follower being in engagement with the second cam track so that the feelers move vertically, in accord with the undulations in the second cam track, as the table is rotated about its vertically disposed axis.

8. A mechanism for orienting a can to a predetermined circumferential position, said can having a bottom chime projecting downwardly below the bottom end of the can and having an off-set on said chime, comprising:

(a) means to rotate said can about its longitudinal axis;

(b) feeler means engageable with the can chime to sense said off-set;

(c) said feeler means including:

(1) a first guide member engageable with the inside face of the can chime;

(2) a second guide member engageable with the outside face of the can chime;

(3) said first and second guide members being spaced from each other a distance slightly greater than the radial thickness of the can chime but less than the radial thickness of the can chime at said off-set such that, upon rotation of the can, the second guide member becomes engaged with the off-set and stops the rotation of the can.

9. A mechanism according to claim 8 wherein:
(a) said means to rotate the can including:
  (1) a rotatable chuck frictionably engageable with the top end of the can;
  (2) power means to rotate the chuck;
  (3) a clip mechanism between said power means and said chuck to permit arrestment of the rotation of the chuck upon stopping the rotation of the can even though the power means remains operative;
(b) a plurality of said cans being simultaneously rotated to orient each can to a predetermined circumferential position;
(c) a rotatable platform engageable with the bottom end of each can;
(d) means to selectively elevate each platform to bring the top end of the can into frictional engagement with one of said rotatable chucks; and,
(e) additional means to selectively elevate said feeler means into engagement with said can chime.

10. A mechanism for orienting a can to a predetermined circumferential position, said can having a bottom chime projecting downwardly below the bottom end of the can and having an off-set on said chime, comprising:
(a) means to rotate said can about its longitudinal axis, said means including:
  (1) a rotatable chuck frictionally engageable with the top end of the can;
  (2) power means to rotate the chuck;
  (3) a slip mechanism between said power means and said chuck to permit arrestment of the rotation of the chuck upon stopping the rotation of the can even though the power means remains operative;
(b) a plurality of said cans being simultaneously rotated by individual chucks to orient each can to a predetermined circumferential position;
(c) a carrying plate rotatably driven about a vertical axis;
(d) said chucks being rotatably mounted to and below said carrying plate and disposed in a circular configuration concentric with said vertical axis;
(e) a small gear affixed to and concentric with each chuck;
(f) a sun gear mounted stationary and concentric with said vertical axis, the sun gear teeth being engaged by said small gear teeth such that rotation of said carrying plate effects rotation of said small gears and chucks about their own axes and movement of the small gears and chucks in a circular path about said vertical axis;
(g) feeler means engageable with the can chime to sense said off-set; and,
(h) means to stop the rotation of the can in said predetermined position due to sensing of the off-set by the feeler means.

11. A mechanism according to claim 10 including:
(a) power means to rotatably drive said sun gear to reverse the direction of rotation of said small gears.

12. The method of assembling a plurality of cans together to form a package of cans which comprises:
(a) moving clips through a closed path;
(b) moving cans in line along a first feed path;
(c) moving said cans from said first path along a first circular path tangential to said first feed path while rotating said cans about their axes into individually oriented positions;
(d) moving a group of said cans along a second circular path tangential to said first circular path into indexed clipping relation with a clip moving in said closed path;
(e) applying said clip to said group of cans to form a package; and,
(f) said second circular path having an axis in the plane of the axis of said closed clip path.

13. An apparatus for assembling a plurality of containers to form a package, comprising:
(a) conveyor means to move a continuous succession of said containers along a path in a first direction, said succession being a first row and a second row of containers;
(b) a pair of star wheels rotatably mounted on the end of the conveyor means, one of the star wheels positioned to receive containers from said first row and convey the containers in a circular path transverse to said first direction, the other of the star wheels positioned to receive containers from said second row and convey the containers transverse to said first direction and opposite to the transverse conveyance of the containers of the first row;
(c) a rotary mechanism located adjacent each star wheel, one of said mechanisms receiving containers from said one star wheel and the other of said mechanisms receiving containers from said other star wheel;
(d) each of said mechanisms including a means for rotating each container about its vertical axis, and second means to engage the rotating containers and stop the rotation when the containers are in a desired position;
(e) a take-off star wheel rotatably mounted adjacent each of said rotary mechanisms, one of said take-off star wheels receiving containers from said one mechanism and the other star wheel receiving containers from said other mechanism;
(f) a secondary conveyor means located adjacent said take-off star wheels;
(g) each take-off star wheel conveying the containers in a circular path from the respective mechanism to the secondary conveyor means, the containers from each take-off star wheel being positioned on the secondary conveyor means in tangentially abutting relationship to each other to form a continuous procession of containers having a width of two containers;
(h) said secondary conveyor means moving said containers in said first direction; and,
(i) Power means adjacent the secondary conveyor means to affix clips to said containers to form a package having a plurality of containers.

References Cited by the Examiner
UNITED STATES PATENTS

| | | | |
|---|---|---|---|
| 2,014,593 | 9/1935 | Sergent | 53—134 |
| 2,150,522 | 3/1939 | Shurley et al. | 101—115 |
| 2,587,953 | 3/1952 | Arneson | 53—48 X |
| 2,762,299 | 9/1956 | Martin et al. | 101—115 |
| 2,886,931 | 5/1959 | Karpowicz | 53—184 |
| 2,892,296 | 6/1959 | Fisher | 53—134 |
| 3,000,157 | 9/1961 | Ollier et al. | 53—184 |
| 3,045,401 | 7/1962 | Ganz | 53—48 |
| 3,096,575 | 7/1963 | Cook | 29—407 |
| 3,129,542 | 4/1964 | Fahrenbach | 53—48 |
| 3,144,740 | 8/1964 | Erickson et al. | 53—48 |

FRANK E. BAILEY, *Primary Examiner.*